T. CARROLL.
CALCULATING MACHINE.
APPLICATION FILED AUG. 13, 1900.
1,118,103.
Patented Nov. 24, 1914.
9 SHEETS—SHEET 1.
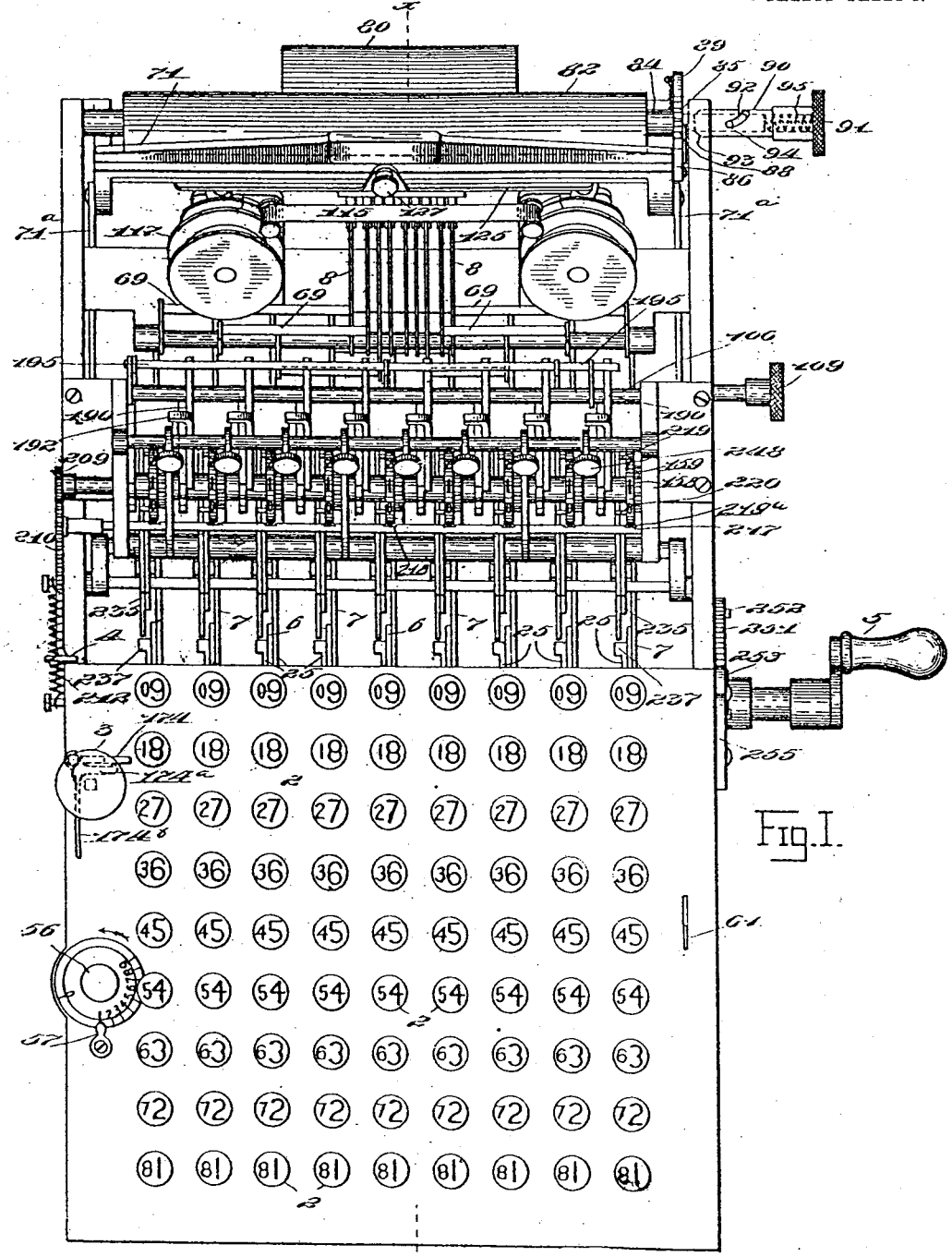
Fig. I.
Witnesses
W. McCarthy
William Muzzy
Inventor
Thomas Carroll
By Alvan Macauley
Attorney

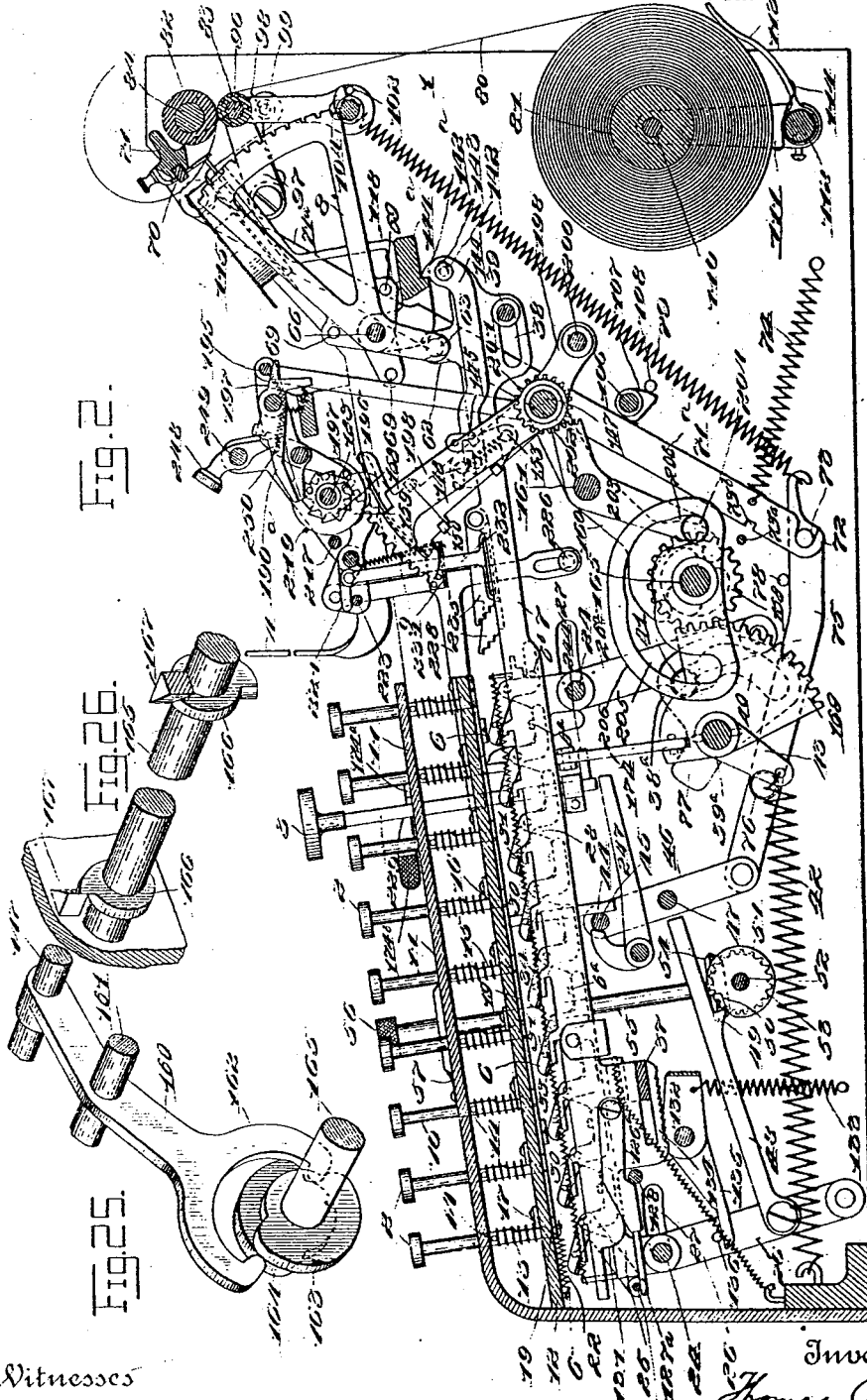

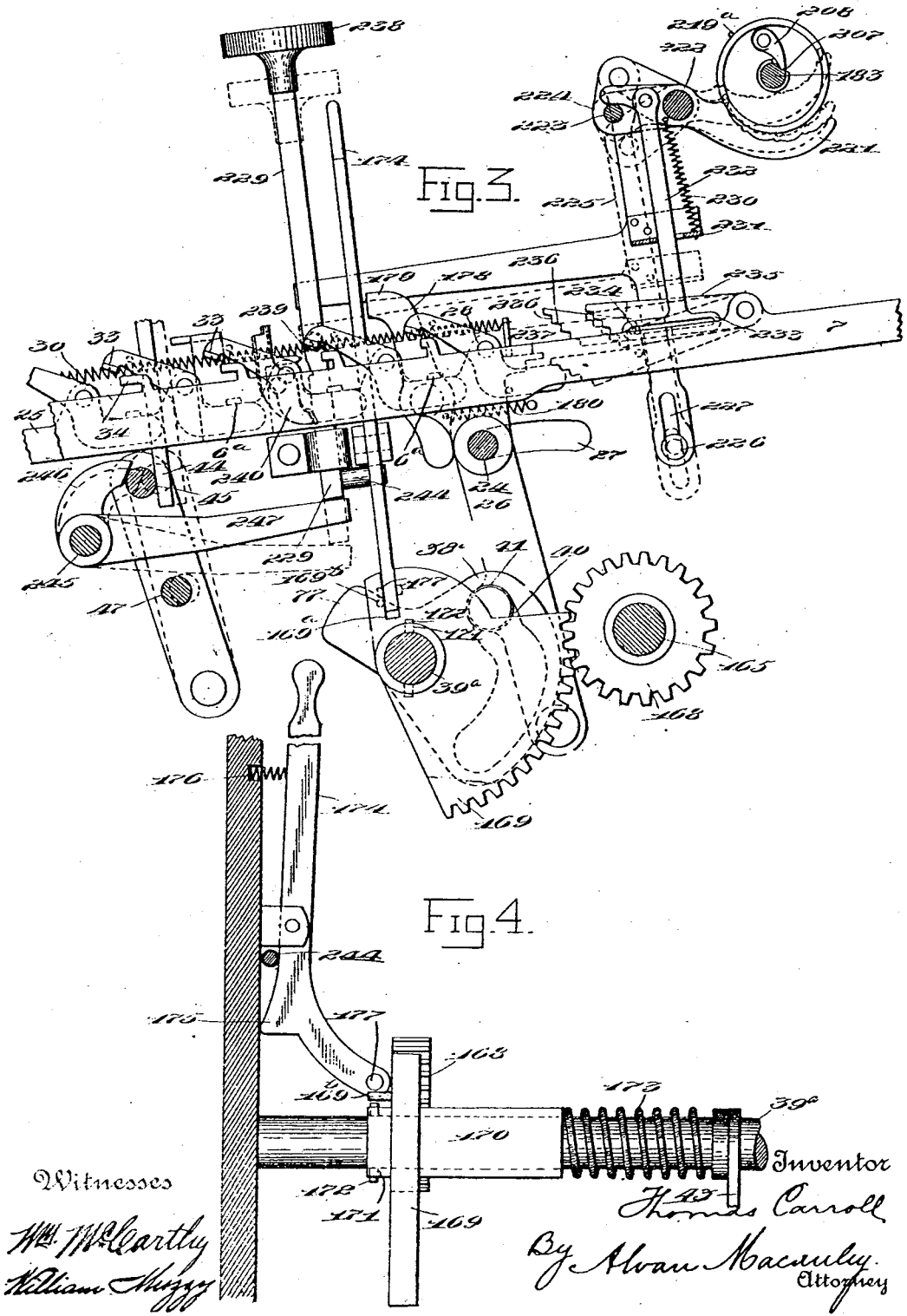

T. CARROLL.
CALCULATING MACHINE.
APPLICATION FILED AUG. 13, 1900.
1,118,103.
Patented Nov. 24, 1914.
9 SHEETS—SHEET 4.
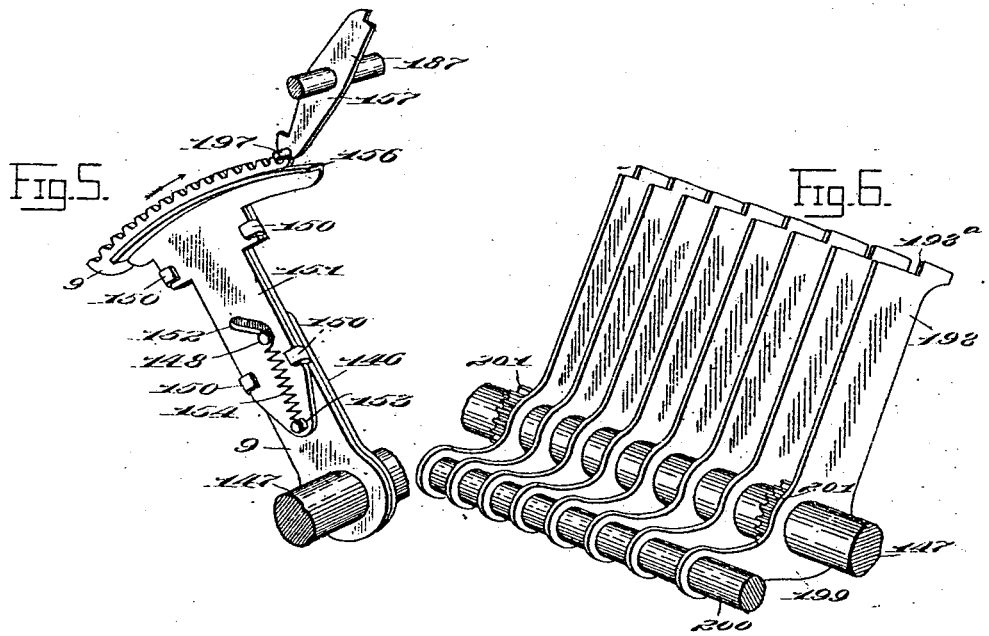
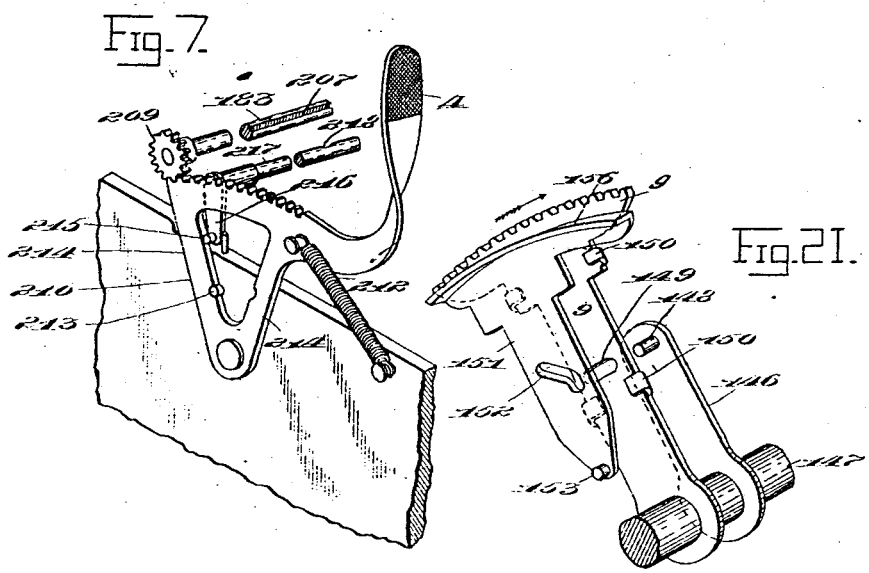
Witnesses
H. McCarthy
William Muzzy
Inventor
Thomas Carroll
By Alvan Macauley
Attorney

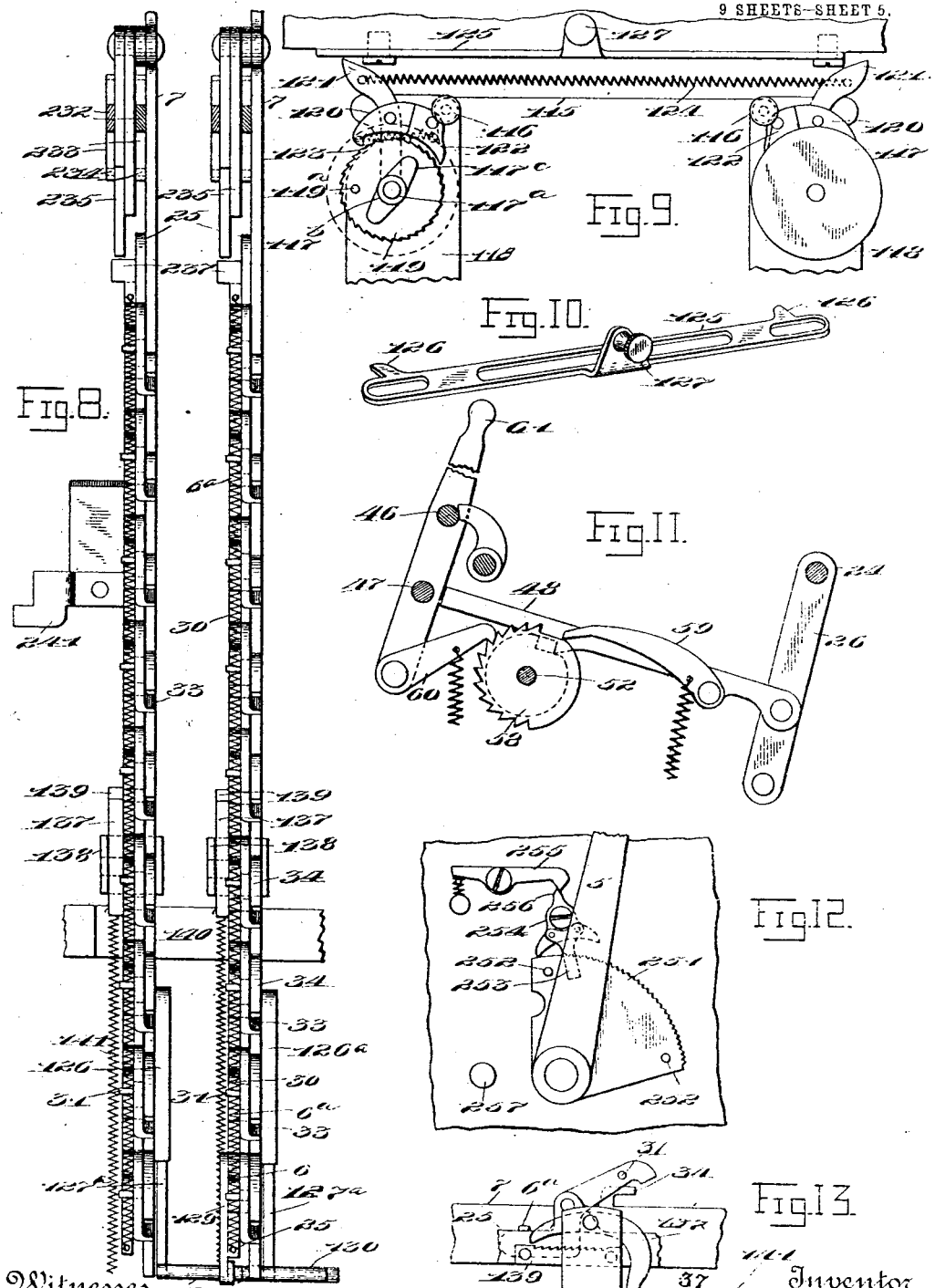

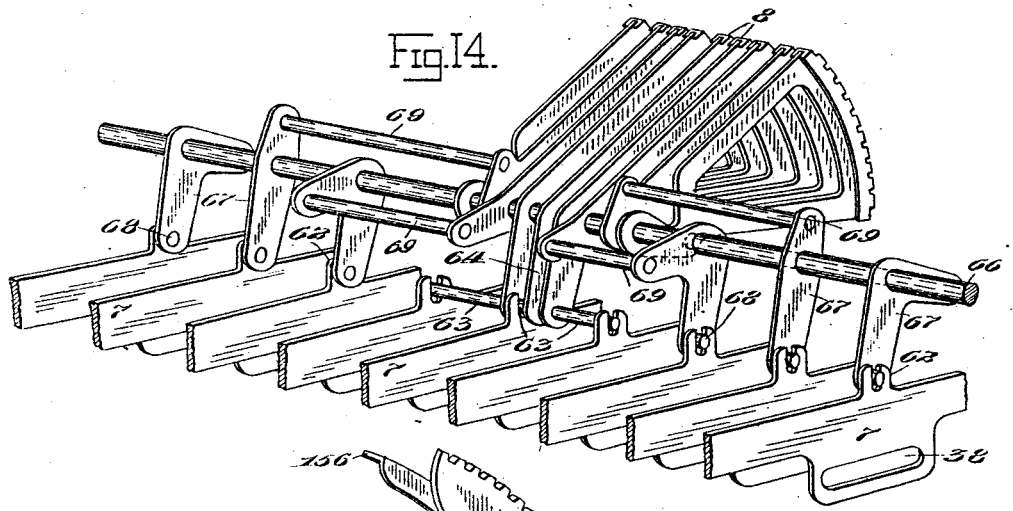

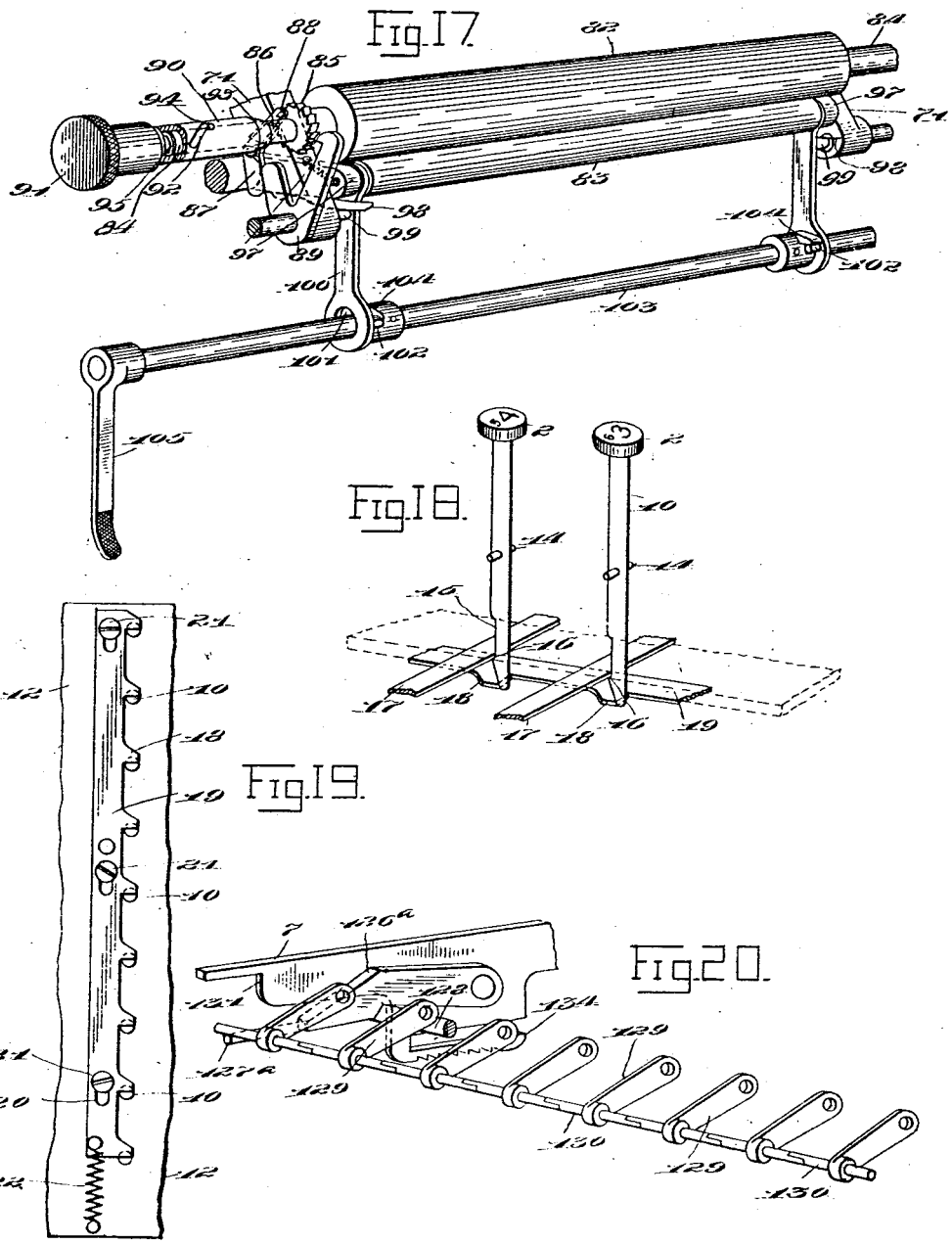

T. CARROLL.
CALCULATING MACHINE.
APPLICATION FILED AUG. 13, 1900.
1,118,103.
Patented Nov. 24, 1914.
9 SHEETS—SHEET 8.
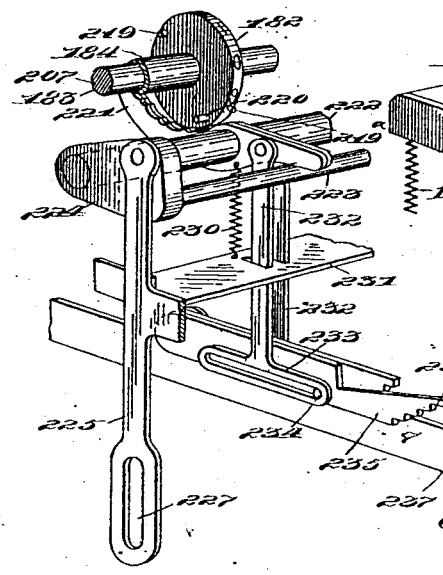
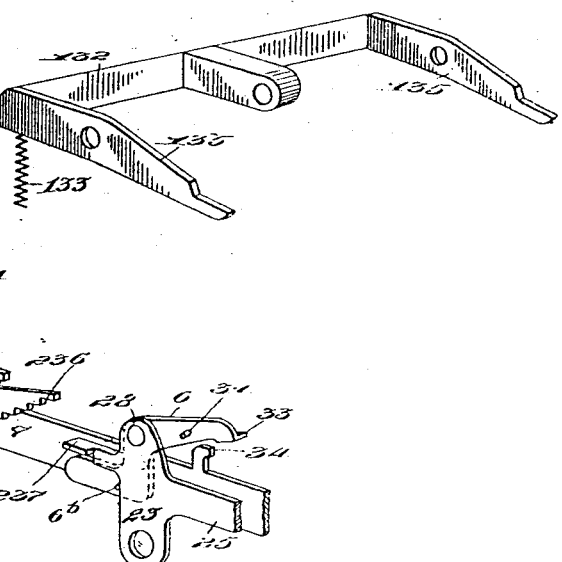
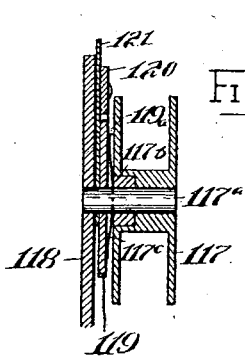
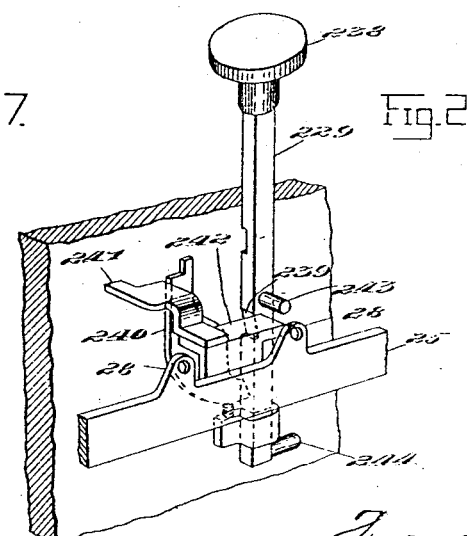

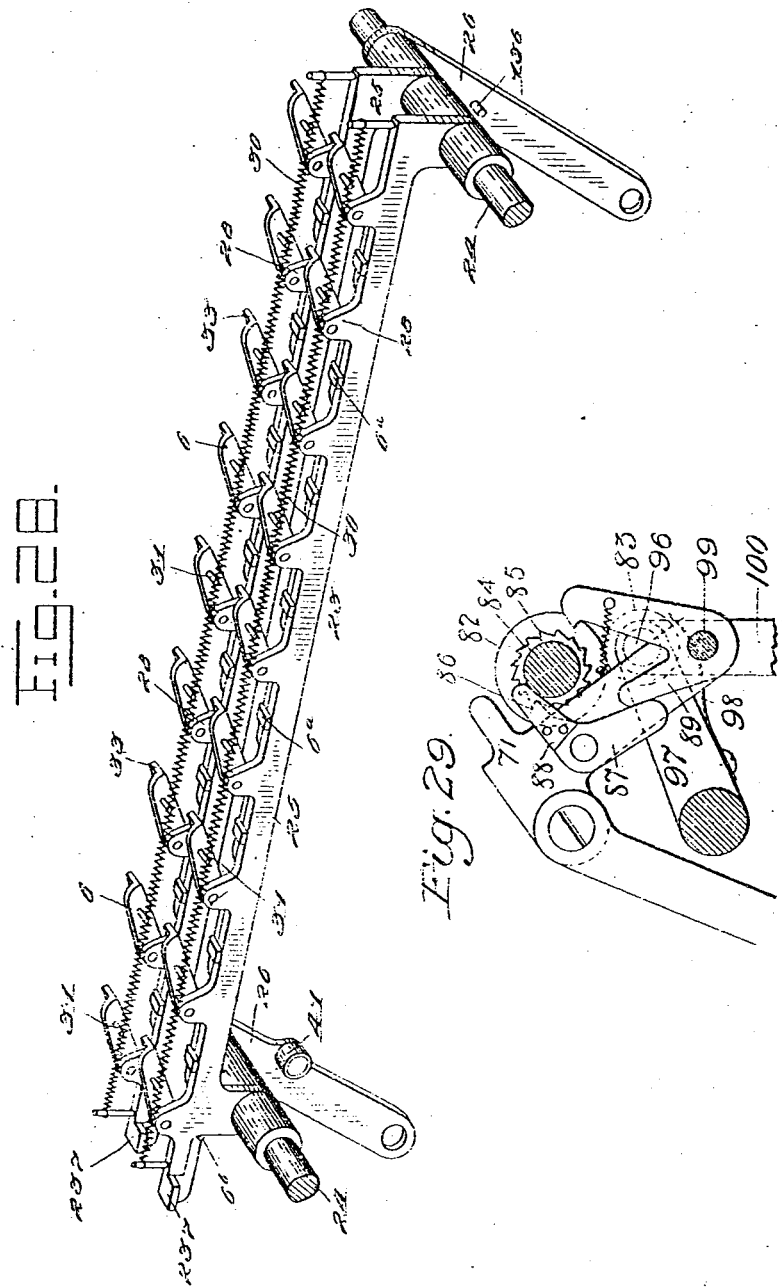

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CALCULATING-MACHINE.

1,118,103.      Specification of Letters Patent.      Patented Nov. 24, 1914.

Application filed August 13, 1900. Serial No. 26,667.

*To all whom it may concern:*

Be it known that I, THOMAS CARROLL, a citizen of the United States, residing at Dayton, in the county of Montgomery and State of Ohio, have invented certain new and useful Improvements in Calculating-Machines, of which I declare the following to be a full, clear, and exact description.

This invention relates to improvements in calculating machines.

One of the several objects of the invention is the provision of an improved mechanism which will print in detail each amount registered and when so desired will print a grand total of all the amounts registered.

A further object is to provide improved mechanism for both printing a detail of each amount and registering the same on a totalizing counter.

In the accompanying drawings forming part of this specification, Figure 1 is a top plan view of the machine embodying my invention with its cabinet removed. Fig. 2 is a vertical longitudinal section through the same on the line x—x of Fig. 1. Fig. 3 is a detail side elevation, partly in section, of the mechanism for setting the printing segments for printing the grand total of the amounts registered. Fig. 4 is an enlarged detail side elevation, partly in section, of the devices for throwing out the counter. Fig. 5 is an enlarged detail perspective view of one of the segmental racks and transfer devices. Fig. 6 is an enlarged detail perspective view of the transfer operating levers. Fig. 7 is an enlarged detail perspective view of the turn to zero lever and coöperating devices. Fig. 8 is a detail top plan view of a portion of the driving frame and two of the counter operating bars. Fig. 9 is a detail top plan view of the inking ribbon feeding devices; one of the spools being omitted to disclose its operating devices. Fig. 10 is an enlarged detail perspective view of the shifting slide for said feeding device. Fig. 11 is an enlarged detail side elevation of the release lever and the devices for setting the machine for repeating a certain operation. Fig. 12 is an enlarged detail side elevation of the device for compelling a full stroke of the operating lever. Fig. 13 is an enlarged detail side elevation of one of the locking pawls for preventing overthrow. Fig. 14 is an enlarged detail perspective view of the operating bars, printing segments and connecting devices. Fig. 15 is an enlarged detail perspective view of one of the operating bars, its segmental rack and connecting devices. Fig. 16 is an enlarged detail perspective view of one of the counter wheels and its transfer devices. Fig. 17 is an enlarged detail perspective view of the paper feeding rollers and coöperating parts. Fig. 18 is an enlarged detail perspective view of two of the keys and their latch plate. Fig. 19 is a detail bottom plan view of one of said latch plates. Fig. 20 is an enlarged detail perspective view of the devices for effecting the printing of the zeros. Fig. 21 is a view similar to Fig. 5 with the parts separated. Fig. 22 is an enlarged detail perspective view of the locking yoke for operating or driven bars. Fig. 23 is an enlarged detail perspective view of the totalizing devices for the printer shown in elevation in Fig. 3. Fig. 24 is an enlarged detail perspective view of the totalizing plunger, its latch and trip for said latch. Fig. 25 is an enlarged detail perspective view of one of the throwing levers for bringing the racks into connection with and disconnecting them from the counter pinions. Fig. 26 is an enlarged detail perspective view of one of the rock shafts with the cams and lugs for shifting the same laterally. Fig. 27 is a detail section through one of the ribbon spools and its tension spring. Fig. 28 is an enlarged detail perspective view of part of the driving frame, and Fig. 29 is a detail side elevation of the feeding rollers and coöperating parts.

In the aforesaid drawings 1 indicates the frame of the machine; 2 the amount keys; 3 the totalizing key; 4 the turn to zero lever, and 5 the operating handle or lever.

In general terms the construction may be said to consist of a series of amount keys, 2, which, when operated set connecting pawls 6 mounted on a movable frame, which frame always has the same degree of movement. These pawls are arranged to engage and operate independent longitudinally movable driven bars 7 according to the value of the key operated. These bars by their graduated movements cause similar movements of printing segments 8 and counter operating rack segments 9.

Each of the keys 2 comprises a numbered head or button and a shank 10. The shanks pass through spaced apertured plates 11 and 12, and are forced up into their normal positions by coil springs 13 which surround said shanks and bear with their opposite ends against said plate 12 and pins 14 mounted on the shanks (see Fig. 2). Each of said shanks is beveled at its lower end and is also formed near said lower end with a notch 15 and a locking shoulder 16. The keys are arranged in nine banks of nine keys each so that the notches 15 of each transverse row will all lie in the same lateral plane to receive one of a series of transverse plates 17 (see Fig. 18) which are secured to the plate 12. The edges of these plates engage the flat sides of the notches 15 and thus prevent the shanks from turning in their guiding plates. The lower beveled ends of the shanks of the keys of each bank coact with spaced noses 18 formed on one of a series of latch bars 19 mounted on the under side of the plate 12 (see Fig. 19). Each of these bars is formed with elongated slots 20 through which are passed screws 21 for securing said bar movably to the plate 12. Each of the bars is held in its normal position with its noses bearing against the beveled ends of the key shanks by a coil spring 22 which connects it to said plate. When one of the keys is depressed its lower beveled end forces its respective nose 18 and bar 19 carrying the same longitudinally until the nose snaps behind the shoulder 16 of the shank and thus holds the key in its depressed position until the bar is subsequently moved longitudinally to release it as hereinafter described.

Mounted just below the key board is an oscillating driving frame 23 which comprises transverse end rods 24 and spaced longitudinal bars 25 connecting the same. The rods 24 are mounted in the upper ends of supporting bars 26 and 26ª which in turn are pivotally mounted at their lower ends upon the sides of the frame. The ends of the rods 24 project into segmental slots 27 formed in the frame (see Fig. 2) whereby the frame 23 is braced in its movements. Each of the aforesaid bars 25 is formed with a series of spaced lugs 28 (see Fig. 3) upon which are pivoted the connecting pawls 6. Each of said bars is further provided with a longitudinally extending coil spring 30 secured at its opposite ends to said bar and resting upon the tops of the lugs 28 as shown in Fig. 8. The office of this spring in each instance is to hold the rear ends of all of the latching pawls of the particular bar to which said spring belongs, in elevated inoperative positions; said pawls carrying pins 31 which rest upon said spring for this purpose. The rear ends of the pawls excepting the rearmost in each bank are formed with lugs 6ª (see Figs. 8 and 13) which contact with the top of their respective bar 25 and thus hold said pawls in their normal positions. Each of the excepted pawls as shown in Fig. 23 is provided with a pin 6ᵇ which contacts with a vertical extension of its bar 25 to hold it in its normal position. The forward ends of the pawls are provided with lugs 33 whereby when one of said pawls is depressed by the depression of its respective key which is located just above it, its lug is brought into the same plane with one of a series of graduated operating hooks 34 (see Figs. 3 and 13). These hooks are formed on the slidable operating bars 7 one of which is provided for each bank. These bars 7 are mounted and guided at their forward ends in suitable grooves formed in a cross bar 37 of the frame and are formed at their rear ends with guiding slots 38 through which passes a transverse guiding and supporting rod 39.

It will be seen by reference to Fig. 3 of the drawing that the hooks 34 are of different lengths and have their operating ends located different distances from the lugs 33 of the connecting pawls 6 according to the value of the key which the pawl represents. Thus when one of said connecting pawls is depressed by its key and the frame 23 moved longitudinally the lug 33 of said pawl will pass under the hook 34 but will not move the bar 7 carrying said hook until the lug reaches the end or operating wall of the hook. The office of the extended portion of each hook 34 is to prevent the return of its respective pawl 6 upward after said pawl has moved forward from under the key which is holding it down.

The aforesaid frame 23 receives longitudinal motion upon each operation of the machine through the medium of its rear supporting bars 26ª each of which is positively rocked or oscillated upon the movement of the handle 5. This oscillation is effected by oscillating disks 38ª fast to a rock shaft 29ª and formed with cam slots 40 into which project anti-friction rollers 41 mounted on said rear bars 26ª (see Fig. 3). The said shaft 39ª receives its motion directly from the crank handle 5 which is fast to the extending end of the same. The shaft is held in its normal position with the operating handle extending upward by a coil spring 42 which is connected to the main frame and to an arm 43 fast to the shaft 39 as shown in Fig. 2. Thus when the handle is drawn forward the spring 42 is put under tension to assist in the return of the handle.

The longitudinal movement of the plates 19 to effect the release of the keys takes place after the lugs 33 have passed under the extended portions of the hooks 34 and is accomplished by pendent rods 44 mounted on said plates. These rods are arranged so as to be engaged and forced rearward by a bar 45 mounted on an oscillating yoke 46 which is suitably pivoted in the main frame and is provided with an operating rod 47. This latter rod is engaged to move the yoke by reciprocating pawls 48, which are pivoted to the forward supports 26, whereby all the slides 19 are moved against the tension of their springs to release any of the keys that may have been set. When the machine is set for ordinary operation the pawls 48 strike the rod 47 upon each movement of the frame 23 but as it is sometimes desirable to set the machine to repeat or successively add certain similar amounts without operating the amount keys but once, I provide means for allowing said pawls to engage the rod 47 only after a certain predetermined number of operations of the machine. To effect this result each pawl 48 is formed with a nose 49 which normally reciprocates in a notch 50 formed in one of two disks 51 upon which said pawl rests. When this disk is rotated the wall of the notch 50 engages the nose 49 and elevates the same so that the end of the pawl 48 is lifted to a position in which it will not strike the rod 47 when it is moved longitudinally. The disks 51 are fast to a shaft 52 which carries a bevel pinion 53. This pinion meshes with a similar pinion 54 mounted on the lower end of a setting shaft 55 which is suitably journaled in the main frame. The upper end of this shaft as shown in Figs. 1 and 2 is provided with a thumb knob 56 having a graduated numbered disk which is arranged to play under an indicating finger 57 mounted on the frame, to indicate to just what extent the thumb knob is turned so that the desired number of repeated operations may be secured. When the disks 51 are in the position shown in Fig. 2 the keys will be released after the first operation of the handle 5 as said disks and the noses 49 of the operating pawls are in operative position. When it is desired to cause the machine to repeat an operation a certain number of times the thumb knob 56 is turned in the direction indicated by the arrow until the pointer 57 points to the desired number. This operation causes the disks 51 to be so rotated that the noses 49 pass out of the notches 50 and ride upon the periphery of said disks which so elevates the pawls 48 that they will not strike the bar 47 when reciprocated. The disks 51 are turned toward normal position step by step as the machine is operated until the noses 49 again drop into the notches 50 when the keys will be released and any further registration prevented. This step by step movement of the disks is effected through the medium of the shaft 52 in the following manner. Said shaft is provided near its right hand end with a mutilated ratchet wheel 58 (see Fig. 11) which is adapted to be engaged and moved forward one tooth at a time by a spring drawn pawl 59 mounted on one of the pawls 48. When the shaft 52 is turned by the thumb knob 56 as above described the pawl 59 rides over all the teeth of the ratchet wheel 58 except a number equal to the number of times it is desired to repeat any certain operation. Upon each operation of the handle 5 the pawl 59 is reciprocated to turn the mutilated ratchet wheel one tooth so that when the machine has been operated the desired number of times the movement of the ratchet wheel will cease as the pawl will simply ride over the mutilated portion of the same without turning it. In order to prevent any backward rotation of the ratchet wheel 58 I provide a spring drawn pawl 60 which is suitably mounted to engage the teeth of the same. The above described devices provide for releasing the keys upon the operation of the machine but as mistakes are sometimes made in depressing the wrong keys it is necessary to provide some means for releasing the keys without operating the machine. To accomplish this result I provide the yoke 46 with an extension or operating lever 61 which projects through a suitable slot formed in the top of the cabinet or casing of the machine. It will readily be seen that by rocking this lever the yoke will also be rocked and thus release the keys in the manner before described.

It will be observed from the above description just how the bars 7 are moved longitudinally according to the value of the key operated and I will now describe how these movements are transmitted to the printing and registering devices. Each of the bars 7 is formed near its rear end with a slotted lug 62 (see Figs. 14 and 15). The lug 62 of the middle bar is arranged to receive a pin 63 mounted on an arm 64 of the middle type segment 8 which is journaled upon a transverse shaft 66. The movement of the bar 7 will thus move the type segment correspondingly to bring the proper type on its periphery into printing position. The two type segments to each side of the middle segment are connected to their respective bars 7 in a similar manner to the middle segment with the exception that the connecting pins 63 are longer. The bars 7 of course are in alinement with their respective banks of keys and as the type segments which lie close together are necessarily out of alinement therewith means must be provided for spanning or bridging the distance between the several bars and their respective segments. This means comprises a series of levers 67 pivoted on the shaft 66 and provided with pins 68 which engage the respective lugs 62. Each of these levers is provided with a laterally extending bar 69 which connects it rigidly with its respective type segment so that the latter will move therewith.

Coöperating with the type segments is an impression platen 70 which is set in a yoke 71 journaled upon a shaft 99 as better shown in Figs. 1 and 29. The yoke is rocked upon each operation of the machine by link bars 71ª, which are pivotally connected to the respective ends of said yoke (see Figs. 1 and 2). The lower ends of these bars are formed with hooks 72 which embrace pins 73 and are held in contact therewith by coil springs 74 which connect said bars to the main frame. These pins 73 are mounted on levers 75 which are pivoted upon the main frame and are provided respectively with anti-friction rollers 76 arranged to be engaged by cams 77 formed on the respective disks 38ª. Thus when the disks 38ª are rocked as before described the cams 77 engage and depress the anti-friction rollers 76 and thus draw the bars 71ª down and rock the yoke 71. Each of the levers 75 is normally drawn upward against a stop pin 78 by a coil spring 79 which connects it with the main frame.

The paper strip 80 passes from a supply roller 81 up between feeding and pressure rollers 82 and 83 respectively. The upper and larger roller 82 is mounted on a rotary shaft 84 (see Fig. 17) which is journaled in the main frame and is provided at one end with a ratchet wheel 85 by means of which it is rotated. This wheel is engaged by a pawl 86 mounted on the yoke 71 and is thus moved one notch upon each oscillation of said yoke. The pawl 86 is provided with a pendant extension 87 and an angular extension 88, the former coöperating with a spring pressed bell crank locking pawl 89 while the latter acts as a guide for said pawl 86 to hold it in the proper position in relation to the ratchet wheel 85. The spring pressure upon this pawl 89 normally causes it to engage the pawl 86 and hold it in engagement with the ratchet wheel 85. Upon the initial movement of the yoke 71 the pawl 86 is so moved as to allow the pawl 89 to engage the ratchet wheel 85; said pawl normally being in the disengaged position shown in Fig. 17. The pawl 86 acts as a feeding pawl and the pawl 89 as a retaining pawl for the said ratchet wheel. As it is sometimes desirable to turn the feeding roller 82 backward in order to feed the paper strip backward some means must be provided for disengaging the pawls 86 and 89 from the ratchet wheel 85. This means consists of a sleeve 90 loosely mounted on the protruding end of the shaft 84 and formed with a thumb nut 91 whereby it may be rotated. This sleeve is also formed with a diagonal or cam slot 92 and has its inner end beveled as at 93 so that when said sleeve is forced inward this beveled end will engage the arm 88 and by its cam action raise the same. The raising of the arm of course disengages the pawl 86 from the ratchet 85 and at the same time causes the arm 87 to force the pawl 89 backward against the tension of its spring to disengage it also from the ratchet. The extended end of the shaft 84 is provided with a pin 94 which projects into the slot 92. The sleeve 90 is normally held in its outer position by a coil spring 95 mounted therein and bearing with its opposite ends against the nut 91 and the end of the shaft 84. It will be seen by reference to Figs. 1 and 17 of the drawings that the spring 95 normally holds the sleeve 90 in its outer position with its beveled end disengaged from the arm 88 but when pressure is exerted upon the nut 91 to turn the same backward the sleeve will be rotated, which action will cause it to move inward as the wall of the cam slot contacts with the pin 94. This inward movement of the sleeve disengages the pawls 86 and 89 from the ratchet wheel 85 as before described so that when the end wall of the cam slot abuts against the pin, the shaft 84 will be rotated with the sleeve. When the nut 91 is released the spring 95 forces the sleeve 90 outward to its normal position and thus releases the pawls 86 and 89 and allows them to again engage the ratchet 85.

The lower or pressure roller 83 is simply intended to hold the paper strip firmly against the roller 82 and is mounted in pivoted supporting arms 97. These arms are suitably pivoted on the opposite sides of the main frame and are normally forced upward by bow springs 98 mounted on the same and engaging rigid pins 99 mounted on the main frame. The shaft 96 is provided with two pendent pivoted links 100 which are formed at their lower ends with elongated slots 101 and provided with pins 102. A rock shaft 103 extends through the slots 101 and is provided with operating noses 104 which are adapted to engage the pins 102. When the shaft is rocked by an operating handle 105 fast to one end of the same the noses 104 force the pins 102 downward and thus also draw the links 100 downward which disengages the roller 83 from the roller 82 and permits of the paper strip being inserted between the rollers or moved forward or backward at will.

As the operation of the platen yoke 71 and the other devices coöperating therewith is dependent upon the operation of bars 71ª I provide means for throwing said bars out of operative positions whereby the machine may be operated without the printing devices being actuated. This means comprises a rock shaft 106 suitably journaled in the main frame and provided with two cams 107, which, when said shaft is rocked engage the respective bars 71ª and force the same forward to disengage the hooks 72 from the pins 73. After this disengagement the operation of the levers 75 will not actuate the bars 71ª and the printer will thus remain passive when the machine is operated. When the cams 107 are in normal inoperative positions they rest against pins 108 mounted on the main frame. One end of the shaft 106 projects beyond the side of the machine as shown in Fig. 1 and is provided with a thumb knob 109 whereby it may be rocked to operate the cams as before described. It will be observed that each of the cams 107 is formed with a flat side so that when it is turned into operative position this flat side will engage its respective bar 71ª and thus hold it in inoperative position. When the parts are thus adjusted the bars 71ª are held against any accidental longitudinal movement by a rod 73ª which is engaged by the walls of notches 73ᵇ formed in said bars.

The supply roller 81 for the strip is mounted on a short transverse shaft 110 which is supported by stationary arms 111 mounted on a rigid shaft 112. This latter shaft supports a pivoted tension plate 113 which is normally forced forward to engage the paper roll by a coil spring 114 mounted on the shaft 112 and having its opposite ends engaged with said plate and one of the arms 111.

The paper strip 80 after being fed through the rollers 82 and 83 passes forward between the platen and an inking ribbon 115 better shown in Figs. 1 and 9. This ribbon passes over guiding rollers 116 and about winding spools 117. Each of the spools 117 is actuated in the same manner and I will therefore describe one only as this description will suffice for both. Each spool is journaled upon one of two vertically inclined studs 117ª fast to brackets 118 mounted on the main frame whereby the spools are held in position by gravity. Each stud is provided with a rigid sleeve 117ᵇ the office of which is to engage a bow tension spring 117ᶜ through which it passes and thus create sufficient friction at this point to retard the rotation of said spring and a ratchet wheel 119 journaled on said stud and against which said spring bears. (See Fig. 27). The spool is caused to rotate with the wheel 119 by a stud 119ª mounted on said wheel and projecting into a suitable aperture in said spool. Each ratchet wheel 119 is arranged to receive motion from an operating pawl 120. This pawl is pivotally mounted upon a cam lever 121 which is journaled upon the journal stud 117ª. A retaining pawl 122 is pivotally mounted on the bracket 118 and engages the wheel 119 for locking the same against retrograde movement. The two pawls 120 and 122 are connected below their pivot points by a coil spring 123 so that their normal tendency is to engage the teeth of the wheel 119. This tendency however is counteracted by a stronger coil spring 124 which connects the levers 121 of the respective spools so as to draw them together and thus force the flat end of each pawl 121 against the flat end of its locking pawl 122. The lower corners of these pawls 120 and 122 of course come together first, but as the tension of the spring 124 is much greater than that of the springs 123 the pawls are turned on their pivots until their flat ends lie snugly together with their operating ends out of engagement with their ratchet wheels.

Movably mounted upon the platen yoke 71 is an operating slide 125 having lugs 126 located near its opposite ends, and adapted to coöperate with the respective cam levers 121, (see Figs. 9 and 10) upon the operation of the platen yoke as before described. When one of the lugs 126 is in position to strike its respective lever 121 upon the operation of the yoke 71 the remaining lug is out of such operative position. The slide is shifted longitudinally to bring either one or the other of the lugs into operative position by a thumb knob 127 mounted thereon. When one of the lugs 126 strikes one of the levers 121 it cams the same to one side against the tension of the spring 124. This action disengages the flat ends of the pawls 120 and 122 and permits them to engage their ratchet wheel so that when the lever 121 is released and drawn forward by the spring 124 said pawl 120 will turn the ratchet wheel while the pawl 122 retains the same. The pawl 122 engages the ratchet wheel just as soon as the pawl 120 starts its retrograde movement and does not disengage from the same until said latter pawl again returns to its normal position. By this structure the pawls 120 and 122 are normally out of engagement with their ratchet wheels so that the slide 125 may be shifted to cause the ribbon to travel in either direction without said pawls acting to hold either of the ribbon spools against the necessary retrograde movement.

In the above described devices means has been provided for moving the printing segments 8 to print numerals from one to nine according to the key operated but as it is also desirable to print the zero indication in the different banks for certain operations mechanism is also provided for this purpose. This mechanism comprises devices for moving all of the bars 7, to the right of the bank in which a key is operated, to bring the zero type on the printing segment to printing position. If any amount key is operated in any of these banks the amount numeral will of course be printed in preference to the zero indication. In order to effect the above results I provide each of the bars 7, excepting the first with a pivoted cam lever 126ª formed at its forward end with an operating pin 127ª (see Figs. 2 and 20). Each of these levers normally rests upon a rigid transverse rod 128 so that when it is moved longitudinally it will be elevated by its cam portion contacting with said rod. The frame 23 is provided with a series of pivoted pawls 129, (see Fig. 8) one for each of the bars 25, and each of said pawls is provided with a notched cross bar 130. The notched portions of these bars overlap from right to left so that, if, say the pawl 129 of the third bank is raised all the pawls to the right of the same would also be raised while the pawls to the left would remain in their normal positions as better shown in Fig. 20. The raising of the pawl 126ª of any particular bank will cause its pin 127ª to raise the cross bar 130 of its particular pawl 129. When one of the pawls 129 is raised as above described its cross bar is brought into alinement with a shoulder 131 formed on its respective bar 7 so that when the frame 23 carrying the pawl is moved longitudinally the cross bar will contact with the shoulder and move the bar 7 just far enough to bring the zero type on its respective segment 8 to printing position.

In order to properly aline the bars 7 after they have been operated I provide a pivoted yoke 132, mounted on the main frame and normally drawn down by a coil spring 133. This yoke is arranged to engage the teeth of rack arms 134 mounted on the bars 7. The said yoke is provided at each end with an operating cam lever 135; said levers being adapted to be engaged and depressed by pins 136 mounted on the forward supports 26, when said supports are moved rearward (see Figs. 2 and 22). The yoke when operated in the above manner engages the teeth of the rack arms 134 which are pendent from the bars 7 and thus alines the bars. As a precaution against the overthrow of said bars 7 to a greater extent than can be corrected by the alining device each of the said bars is provided with a retaining pawl 137 better shown in Fig. 13. Each of these pawls is pivotally mounted upon a yoke plate 138 secured to its respective bar 7 and extending under the same and also under the companion bar 25 and up beside said latter bar to bring the pawl into the proper position to engage a rack 139 fast to the latter bar. When the bars 7 are in normal position the pendent ends of the pawls 137 engage the rigid cross bar 37 of the main frame and thus hold said pawls out of engagement with the racks 139. But when one of the bars 7 is moved rearward its pawl 137 disengages from the bar 37 so that a spring 141 which connects the pawl to the main frame will cause it to engage its rack 139 and thus prevent any overthrow of the bar. When so engaged the frame 23 and the operated bar 7 are firmly locked together.

Having thus described the devices for imparting graduated movements to the bars 7 and communicating these movements to the printing devices to print a detail of each transaction I will now pass on to the description of the means for communicating the movements of said bars to the counter. This means is the same for each bank, and I will therefore describe the same in connection with one bank only as this description will suffice for all the remaining banks. Each of the bars 7 is provided at its rear end with a stud 142 which projects into an elongated slot 143 formed in a link 144 (see Figs. 2 and 15). This link is formed with a vertical notch 145 and is pivotally connected at its forward end to an operating lever 146. This lever is journaled upon a transverse shaft 147 and is provided as shown in Figs. 5 and 21 with an operating stud 148 which projects through an elongated slot 149 formed in its respective segmental rack 9 which latter is also journaled on the shaft 147. The said rack is further provided with angular guiding fingers 150 the office of which is to support and guide a slidable transfer plate 151 beside said rack segment. This transfer plate is formed with a diagonal slot 152 for the reception of the stud 148 and is further provided with a stud 153; a coil spring 154 connecting said studs so as to normally hold the slide into its upper position. The slot and pin connection 142 and 143 between the bar 7 and the link 144 permits of the bar making its initial movement to set the printing segment for printing the zero character, without moving the registering rack 9. After the bar 7 has moved rearward the length of the slot 143 the link 144 is operated to move the lever 146 and thus actuate the rack segment according to the degree of movement of the aforesaid bar. As the lever 146 rocks rearward it elevates the forward end of the link 144 so that a pin 155 mounted on the bar 7 will enter the slot 145 and lock the link and bar together so that they will move simultaneously independently of their slot and pin connection. When the bar 7 approaches the end of its stroke a nose 142ª on the link 144 strikes a cross bar 144ª of the main frame and thus arrests the link and segmental rack connected thereto before the movement of the bar 7 has ceased. During the aforesaid rearward movement of the lever 146 the pin 148 has been in engagement with the rear end of the slot 149 so that when said lever ceases to move the rack 9 may be given an extra independent movement, during which the pin will play through the slot without moving the lever. This extra transferring movement of the rack 9 is secured in the fol- lowing manner. It will be observed that the connection between the rack 9 and the slide 151 is such that the two must move together laterally. When the lever 146 is stationary the pin 148 acts as a fixed fulcrum so that if the slide 151 is depressed the incline walls of its slot 152 will engage said pin and thus force the slide laterally rearward which movement will carry the rack rearward the same distance and thus effect the transfer. The slide is depressed to accomplish this result through the medium of a segmental flange 156 formed on the upper end of the same. The flange is engaged and depressed by a pivoted transfer pawl 157 hereinafter more fully described.

Each of the segmental racks 9 is adapted to engage and operate a counter pinion 158 fast to a counter wheel 159. The engagement of the racks and pinions is only during the time that the former are moving in one direction and to accomplish this engagement and disengagement the following mechanism is employed: As before stated the segmental racks 9 are mounted upon a shaft 147 and this shaft is in turn mounted in the ends of two levers 160 which are pivoted upon a transverse shaft 161. Each of the levers 160 is formed at its forward end with a yoke 162 and each of said yokes coöperates with two cams 163 and 164 mounted on a rock shaft 165 (see Figs. 2 and 25). When the shaft 165 is moving in one direction the cams 163 are actuating the levers 160 and when said shaft is moving in an opposite direction the cams 164 are in operative connection with said levers. To effect this result the shaft 165 must be moved longitudinally during each operation of the machine. This longitudinal movement is accomplished by cams 166 mounted near the opposite ends of said shaft and arranged to coöperate with bevel faced lugs 167 formed on the side plates of the frame, (see Fig. 26). It will be observed by reference to said figure that when the operating face of one of the cams 166 is engaging its lug 167 the face of the remaining cam is in a diametrically opposite position. This arrangement causes the shifting of the shaft 165 to be effected at its final rotary movement in either direction. It will be seen from the above description that upon each oscillation of the shaft 165 the rack segments will be moved into mesh with the counter pinions before they are moved rearward and out of such mesh before their forward movement is commenced.

The shaft 165 receives its rocking or oscillating motion through the medium of a pinion 168 fast thereto and meshing with a segmental gear 169 mounted on the main operating shaft. The width of the pinion 168 is such that it will remain in mesh with the gear 169 when the shaft is in either of its shifted positions or when the gear 169 is moved laterally.

As it is sometimes desirable to operate the machine in connection with the printer without operating the counter I provide mechanism for disengaging the gear 169 from the driving shaft 39 upon which it is mounted. To effect this result the gear 169 is provided with a sleeve 170 which is formed at one end upon diametrically opposite sides with notches 171 into which normally project pins 172 fast to the shaft 39 (see Figs. 3 and 4). When in this normal position the sleeve and shaft are coupled together and the movement of the shaft 39 will cause the counter operating racks to be thrown into and out of mesh with the counter pinions as before described. The sleeve its held in this normal position by a coil spring 173 which surrounds the shaft 39 and bears with its opposite ends against said sleeve and the aforesaid arm 43. When it is desired that the counter operating racks remain out of mesh with the counter pinions the sleeve 170 is moved laterally against the tension of the spring 173 until the pins 172 are clear of the notches 171 when the oscillation of the shaft 39 will not effect said sleeve and gear. This lateral movement is effected by a pivoted lever 174 mounted on the main frame and projecting above the same so that it may be grasped and operated by hand. The lower end of the lever is formed with a stop and operating nose 175 which is normally forced into engagement with the main frame by a coil spring 176 interposed between the upper end of said lever and the main frame. Said lower end of the lever is also provided with laterally projecting pins 177 which bear against the side of the gear 169 so that when said lever 174 is operated the gear and sleeve 170 will be shifted laterally to disengage the notches and pins 171 and 172. The lower end of the lever 174 when in this position projects into a slot 169ª formed in the gear 169 and thus prevents the latter from accidentally turning (see Fig. 3). The gear 169 is further provided with a pin 169ᵇ which bears against the side of the lever 174 and assists in preventing accidental movement of said gear. In order to lock the lever 174 against operation after the movement of the machine has commenced I pivot a locking lever 178 upon the main frame in such position that its lower end will be engaged and faced forward by the rear bar 24 when the frame 23 is in normal position. The upper end of the said lever 178 is formed with a locking nose 179 which when the lever is released by the operation of the frame 23 is drawn forward between the lever 174 and the main frame by a coil spring 180 which connects the lower end of said lever 178 to the main frame. When the nose 179 passes between the lever 174 and the main frame it occupies the entire space between the two and thus prevents any movement of said lever until the frame 23 returns to its normal position and the bar 24 forces the lower end of the lever 178 forward against the tension of its spring. As the lever 174 is forced by spring 176 into its normal inoperative position I provide an angular spring pressed latch 174$^a$ (see Fig. 1) mounted upon the plate 11 so as to engage and hold the lever when it is drawn into its operative position. This latch is formed with a thumb piece 174$^b$ by means of which it may be operated against the tension of its spring to release the lever 174. As before stated each of the racks 9 is arranged to engage its respective counter pinion 158 (see Figs. 1 and 2) upon its rearward movement only and thus impart the proper movement to the counter wheel 159 carried by said gear.

As the operations of the respective racks in connection with their pinions and counter wheels are similar in each instance I will describe one only as this description will suffice for all. All of the counter wheels are journaled upon a transverse rotary shaft 183 and each of the same is provided with a sleeve 184 carrying a ratchet wheel 185. This latter wheel is engaged by a spring pressed pawl 186 mounted on a transverse rod 187 whereby all retrograde movement of the counter wheel is prevented. The ratchet wheel 185 is provided with two laterally projecting pins 188 and 189 located upon opposite sides of the same. After the counter wheel and its ratchet have moved one complete revolution which equals one unit of the next higher order the pin 189 engages and raises the forward end of a spring pressed latching pawl 190 which is pivoted upon a transverse shaft 191. Simultaneously with this action the pin 188 engages the lower beveled end of the transfer pawl 157 and forces the same rearward so that the upper notched end of said pawl will catch over an arm 192 formed on the pawl 190 when the latter is allowed to again assume its normal position. The pawls 157 and 190 may be termed transfer controlling devices or provisions, inasmuch as they serve to determine whether or not the operating devices which actually cause the transfer shall operate. The transfer pawl is thus held cocked until it is operated to effect the transfer as hereinafter described. When the latching pawl is in its normal position shown in Fig. 16 the pawl 157 is free to be drawn rearward by its coil spring 193 into its inoperative position. The pawl 190 is also in inoperative position as shown in Fig. 16 and is normally held so by an arm 194 formed on said pawl and depressed by a pivoted yoke 195 (see Fig. 1). This yoke is pivoted upon the shaft 191 and is depressed by a link 196 connected thereto and to the shaft 147 (see Fig. 2). When the shaft 147 moves upward upon the initial movement of the machine the yoke 195 is raised and thus releases all the pawls 190 and allows them to descend to their operative positions. At the final movement of the machine the pawls are again elevated by the yoke to inoperative positions so that any of the transfer pawls that have been cocked during the operation of the machine, will return to normal position.

When one of the pawls 157 is cocked for transfer as before described its lower end is so depressed that a pin 197 carried thereby will lie in the path of one of a series of transfer levers 198 (see Figs. 2 and 6), so that when said levers are operated the pawl will be turned on its pivot whereby its lower end will engage and depress its respective transfer slide 151 as before described. These levers 198, as better shown in Fig. 6 are journaled upon the shaft 147 and are provided with extensions or arms 199 which are connected by a rigid rod 200 whereby all of said levers must move simultaneously. The upper ends of the levers 198 are formed with notches 198$^a$ of different depths which increase from right to left. The levers 198 and coöperating parts serve to finally effect the transfers, that is they are the parts which when operated directly and immediately cause the transfer movement of the higher order wheels as determined by the transfer controlling provisions previously referred to. The forward walls of these notches contact with the respective pins 197 successively so as to permit a transfer to be made by a transfer; i. e. a transfer to be made to a counter wheel showing nine which of course necessitates a transfer to the succeeding counter wheel. Each of the end levers 198 is provided with a pinion 201, which pinions as better shown in Fig. 2, mesh with racks 202 formed on bell crank levers 203. These levers are journaled upon the shaft 161 near the opposite ends of the same and are provided respectively with anti-friction rollers 204 which project into cam slots 205 formed in cam disks 206 fast to the shaft 165. It will be seen by reference to Fig. 2 of the drawings that the cam slots 205 are so shaped that the levers 203 will only be moved near the latter part of the operation of the machine and will thus effect the transfer after the regular operations of the racks 9 have ceased.

As before stated all of the counter wheels are mounted upon a shaft 183 and are free to revolve thereon in a forward direction. This shaft is formed with a longitudinal groove 207 (see Figs. 3 and 7) so that when it is rotated the wall of said groove will engage pivoted spring pressed pawls 208 mounted on the respective counter wheels and thus carry said wheels to zero. Movement is imparted to the shaft to secure this result through a pinion 209 fast to the end of the same as shown in Figs. 1 and 7. This pinion is engaged by a segmental rack 210 which is pivotally mounted upon the main frame and is provided with an operating handle 4 whereby it may be oscillated to actuate said pinion. The rack is normally drawn forward by a coil spring 212 which connects it with the main frame. The said rack is limited in its movements by a pin 213 mounted on the main frame and adapted to form a stop for the side bars 214 of said segment. These side bars are also arranged to contact with and operate a crank pin 215 mounted on a crank arm 216 which latter is fast to a rock shaft 217. This shaft is suitably mounted in the counter frame and is formed with a series of notches 218 corresponding in position with the respective counter wheels. When the shaft 217 is in its normal position shown in Fig. 1 the counter wheels pass freely through the notches 218 but when the shaft is rocked as before described by the tipping of the frame 210 the notches are so moved that their bottoms form stops for pins 219ª mounted on the peripheries of the counter wheels and thus positively arrest said wheels at the zero point.

The mechanisms heretofore described cover the means for printing a detail of each amount and registering a total of all the amounts combined and I will now describe the devices for printing a grand total of all the amounts registered, which total will correspond with the total indicated on the counter wheels. Each of the counter wheels is provided on one side with two pins 219 and 220 located at diametrically opposite points. (See Fig. 23.) Co-operating with these pins are two curved notched levers 221 which are pivotally mounted upon a transverse shaft 222. The levers are located side by side so that one of the same will contact with the short pin 219 and the other with the long pin 220. The forward ends of the levers are held normally elevated by a cross bar 223 which is mounted at its opposite ends in arms 224 pivoted on the shaft 222. Each of said arms is pivotally connected to a slide 225 which is guided at its lower end by a pin 226 mounted on the main frame and projecting through a slot 227 formed in said slide. One of said slides is also formed with a rigid arm 228 (see Fig. 3) which projects into a notch formed in a plunger bar 229 so as to move therewith; said bar being operated as hereinafter described. When the slides 225 are moved downward by the depression of the plunger 229 the cross bar 223 is also moved downward and thus permits the levers 221 to ascend at their rear ends until they engage their respective pins upon the counter wheels. The positions of said pins therefore govern the movements of said levers so that they move only so far as the value indicated upon the counter warrants. When the levers are released they are drawn into the aforesaid positions by coil springs 230 which connect them to an apertured guide plate 231 mounted at its opposite ends upon the slides 225. Connected to the forward end of each of the levers 221 is a pivoted pendent link bar 232; said links passing through the guiding apertures formed in the plate 231. The lower end of each of the links 232 is formed with a slotted cross bar 233 into which projects a pin 234 mounted on one of a series of graduated operating levers 235 pivotally mounted on the respective bars 7. As there are two of the levers 221 and two of the links 232 for each counter wheel there are also duplicated levers 235 for each bar 7. The said graduated levers are pivoted to their bar 7 at their rear ends and are formed at their forward ends with graduated stair-step shoulders 236. It will be seen by reference to Figs. 3 and 23 of the drawings that the graduated shoulders 236 of each pair of levers 235 are all different distances from the pivot point of said levers and thus represent different values or degrees of movement of said bar 7 to which they are pivoted. The shoulders 236, of each pair of levers 235, it will also be observed, are equal in number to the numbers upon a single counter wheel. The arrangement of said levers 221 is such that when they are allowed to ascend at their rear ends and the long pin 220 is in position to intercept them, the levers 235 are arrested in the same plane but as one of said levers projects farther forward than the other, one of its shoulders will lie in the path of a lug 237 on one of the bars 25 of the driving frame. If the short pin 219 should be in operative position it will arrest only the inner one of said levers 221 and will thus hold the shorter lever 235 in the path of the lug 237 and allow the longer lever to drop below and out of the path of said lug. When the frame 23 is moved rearward by the operation of the handle 5 the lugs 237 will contact with the shoulders 236 lying in their paths and thus move the bars 7 rearward and set the printing segments according to the values represented by said shoulders. The above described devices are only set in operation of course when it is desired to print the grand total of all the amounts registered and are set for operation as before stated by the depression of the plunger bar 229. This bar is provided at its upper end with a handle or knob 238 by means of which it may be depressed and is formed in its side with a latching notch 239 into which a spring pressed latching pawl 240 mounted on the main frame, is adapted to catch when said plunger is depressed to hold it in this depressed position. This latch is arranged to be tripped to release the plunger upon the operation of the machine by an angular arm 241 mounted on the frame 23 (see Figs. 3 and 24) and moving in the same plane as that occupied by the upper end of the pawl. The arm 241 is further provided with a flat plate 242 which, after the movement of the machine has commenced, occupies a position under an anti-friction roller 243 mounted on said plunger rod so as to prevent the depression of the latter at all times except when the machine is in normal position. The plunger rod is further provided at its lower end with an anti-friction roller 244 which, when the rod is depressed, engages the shoulder 175 of the lever 174 (see Fig. 4) and operates the lever to disconnect the counter as before described; such disconnection being necessary in order to prevent the operation of the counter upon the movement of the bars 7 to set the printer for the total amount. In order to prevent any possible action of the bars 7 because of the operation of any of the keys when the grand total is being taken, I provide for releasing any keys that may be depressed upon the operation of the plunger rod 229. To effect this result I provide a rock shaft 245 (see Fig. 3) having two operating arms 246 which are adapted to engage the key releasing rod 45 and force the same forward. One of said arms 246 is provided with an extension 247 which projects under the lower end of the plunger rod 229 whereby when the latter is depressed the said arms are operated and any key which may have been depressed is released. The condition of the counter remains undisturbed by the taking of the total from it for the printer and thus a total may be struck off at any time and the additions to the grand total on the counter subsequently continue.

By reference to Fig. 2 it will be seen that after the paper strip 80 leaves the platen it is carried upward and rearward and allowed to drop down back of the machine which course exposes its under printed side to the operator: the amount last printed becoming visible after each operation and thus indicating to the operator, his mistakes, if any have occurred. In order to compel a full stroke of the operating handle 5 the same is provided as shown in Figs. 1 and 12 with a segmental ratchet plate 251 having tripping pins 252 which coact with a tripping arm 253 mounted on a double acting pawl 254. This pawl is pivoted upon the main frame and is held in either of its positions under spring pressure by a spring pressed pawl 255 also mounted on the main frame and engaging a nose 256 of the pawl.

254. It will be seen that the pins 252 engage the arm 253 at the opposite ends of the stroke of the lever 5 and thus shift the pawl 254 to permit a reverse movement of the lever in a manner well known in the art and needing no further explanation. A stop pin 257 mounted on the main frame limits the forward movement of the segment 251.

The foregoing description relates exclusively to the machine in its capacity of an adding machine but like all adding machines it may be employed also for subtraction, division and multiplication by performing a series of additions. As these operations are well known in the art I will only describe the more common operation of subtraction. In adding machines the operation of subtraction is performed by adding a sufficiently large number to the minuend to complete the capacity of the machine and leave the correct remainder or difference between the minuend and subtrahend. In order to instantly know just what keys to press to secure the proper amount as mentioned above I have provided each of the keys, in addition to its large regular numeral, with a small colored numeral to be used for subtraction operations. The colored numerals read from 0 to 8 and they are arranged in the reverse order from the large numerals, i. e. from the top down. Now for example if the minuend is 500 and the actual subtrahend 400, the subtrahend to be placed on the machine will be one less or 399. The key containing the small numeral 3 in the hundreds bank is depressed and no keys operated in the tens and units bank as there are no nines in the small figures. This operation it will be seen is equal to the addition of 600 which together with the 500 would make 1100.

Heretofore all the nine keys to the left of the highest figure of the subtrahend have been operated in order to eliminate the amounts carried by transfer to the counter wheels above those containing the minuend; but in my present machine I provide for cutting out the transfer without operating said nine keys. I effect this result by a series of keys 248 one for each pawl 157 and pivotally mounted on a transverse shaft 249. (See Figs. 1 and 2). These keys are so arranged that when operated they will engage pins 250 mounted on their respective pawls and thus force the upper ends of said pawls so far forward that their lower ends pass out of operative positions. As there is one of the keys 248 for each of the transfer pawls it is only necessary to press the key to the left of the highest number of the minuend in order to cut out all transfers above that point but if the subtrahend has a less number of figures than the minuend it is still necessary to press the nine keys in the banks to the left of the subtrahend to and including the highest numeral of the minuend. For example if the minuend is 5000 and the subtrahend 50, then the keys for 49 (small numerals) will be depressed and also the keys for 9900 (large numerals) and lastly the cut out key between the thousand and ten thousand bank. In the example given the keys pressed (large numerals) would be 9950 which added to the minuend 5000 would ordinarily result in 14950 but as the transfer above the thousand bank has been cut out the remainder of 4950 is shown.

Having thus described my invention what I claim as new and desire to secure by Letters Patent is:—

1. In a calculating machine, the combination with a counter, of a driving member, driven counter operating members having graduated projections, a series of pivoted pawls mounted on the driving member, and a series of keys for operating said pawls to bring them into connection with the graduated projections.

2. In a calculating machine, the combination with a counter, of a movable driving frame constructed to have movements of invariable extent, a series of counter operating bars having graduated projections, a series of pivoted pawls, on the movable frame, springs for normally holding said pawls out of engagement with said projections, and keys for forcing said pawls into such engagement.

3. In a calculating machine, the combination with a counter, of a driving frame constructed to have movements of invariable extent, a series of driven counter operating bars, a series of connecting pawls mounted on the frame and arranged to engage said bars to move the same and a series of keys for operating said pawls.

4. In a calculating machine, the combination with a counter, of a driving frame constructed to have movements of invariable extent, a series of driven counter operating bars having graduated projections, a series of connecting devices mounted on the frame, and a series of keys for operating said connecting devices to cause them to move into position to engage and operate the bars.

5. In a calculating machine, the combination with a counter, of a movable driving frame constructed to have movements of invariable extents, a series of slidable counter operating bars having graduated projections, a series of movable connecting devices mounted on the frame and adapted to be brought into connection with the graduated projections, and keys arranged to engage and operate said connecting devices.

6. In a calculating machine, the combination with a counter, of a movable driving frame constructed to have movements of invariable extents, a series of independent counter operating bars having graduated projections, a series of pivoted connecting pawls mounted on the frame and arranged to engage said projections, and keys arranged to force said pawls into engagement with the projections.

7. In a calculating machine, the combination with a counter, of a driving member constructed to have movements of invariable extents, a slidable counter operating member having graduated projections, a series of pawls mounted on the driving member, and a series of keys for operating said pawls to force them into operative relation with said projections.

8. In a calculating machine, the combination with a counter, of a driving member having a series of spaced bars, a series of driven bars having graduated projections, a series of pawls pivoted on the spaced bars so as to engage said graduated projections and having projections which normally rest upon the spaced bars, springs for holding said pawls in their normal positions, and keys for operating said pawls.

9. In a calculating machine, the combination with a counter, of a driving member, a series of driven bars having graduated projections, a series of pawls pivoted on the driving member and having lateral projections which engage the graduated projections and a series of keys for operating said pawls.

10. In a calculating machine, the combination with a counter, of a driving frame having a series of spaced bars, counter operating bars arranged between the spaced bars and provided with graduated projections, connecting pawls mounted on the spaced bars, and keys for operating said pawls.

11. In a calculating machine, the combination with a counter, of a driving member, driven counter operating members having graduated projections, a series of movable connecting devices mounted on the driving member, and a series of keys arranged to operate said devices.

12. In a calculating machine, the combination with a counter, of a driving frame, counter operating bars arranged to be operated by said frame, and pivoted spring pressed pawls arranged to automatically couple the bars to the frame after the movement of the bars has commenced.

13. In a calculating machine, the combination with a counter, of a driving member, a driven member, movable devices on the driving member arranged to be moved into connection with the driven member, and a single spring for normally holding all of the connecting devices out of engagement with the driven member.

14. In a calculating machine, the combination with a counter, of a movable driving member arranged to receive an invariable movement at each operation thereof, a series of slidable counter operating bars having graduated projections and a series of pivoted pawls mounted on the driving member and arranged to be brought into engagement with the projections of the driven members.

15. In a calculating machine, the combination with a counter, of a driving member arranged to be given invariable oscillations, a series of driven counter operating members having graduated projections, a series of movable connecting devices mounted on the driving member and means for bringing any one of said connecting devices into position to engage and operate the driven members.

16. In a calculating machine, the combination with a counter, of a driving member, driven counter operating members formed with projections, pivoted pawls mounted on the driving member, and a series of keys for operating said pawls to bring them into connection with the respective projections.

17. In a calculating machine, the combination with a counter, of a driving member, driven counter operating members having projections formed with fingers extending parallel with the plane of movement of said members, movable devices mounted on the driving member and arranged to be operated by the keys so as to pass under the fingers and remain in engagement therewith after said devices have passed out of engagement with the keys.

18. In a calculating machine, the combination with a counter, of a driving member, driven counter operating members having graduated hook projections, a series of movable devices mounted on the driving member and arranged to be depressed for engagement with the hook projections and a series of keys for depressing said movable devices.

19. In a calculating machine, the combination with a counter, of a driving member, driven counter operating members having graduated projections, a series of movable connecting devices mounted on the driving member, and a series of keys for operating said connecting devices to bring them into connection with the graduated projections.

20. In a calculating machine, the combination with a counter, of a common driving member, a series of graduated counter operating elements, a series of movable devices on the movable member, springs for normally holding said devices out of engagement with the counter operating elements, and keys for moving said movable devices into such engagement.

21. In a calculating machine, the combination with a counter, of a driving member, driven graduated counter operating members, a series of movable devices mounted on the driving member and a series of keys for operating said movable devices to bring them into coöperative relation with the graduations of the driven members.

22. In a calculating machine, the combination with a counter, of a driving member having a regular movement upon each operation thereof, a series of driven counter operating members, graduated connecting devices between said driving and driven members, and a series of keys for bringing the proper connecting devices into operative position at will.

23. In a calculating machine, the combination with a counter, of a driving member given an invariable movement at each operation thereof, a series of counter operating elements having graduated projections, means for connecting the driving member and operating elements, and a series of keys for controlling said connecting means.

24. In a calculating machine, the combination with a counter, of a movable driving member given an invariable movement at each operation thereof, a series of counter operating elements having graduated projections, a series of movable devices for connecting the driving member and operating elements, springs for holding said movable devices in inoperative position, and keys for actuating said movable devices against the tension of the springs.

25. In a calculating machine, the combination with accounting devices, of means for differentially positioning said devices, operating members having a constant excursion at each actuation thereof, a plurality of manipulative devices, and means one for each manipulative device operated by said devices and mounted on said operating members, for connecting said positioning means to the operating members.

26. In a calculating machine, the combination with a differentially movable element, and an actuating element therefore having a constant excursion at each operation, of manipulative devices, and a plurality of devices mounted on said actuating element and positioned to be adjusted by said manipulative devices to a position such that they will connect the differentially movable element to the accounting element.

27. In a calculating machine, the combination with a counter, of a driving member, driven members, connecting pawls mounted on the driving member and having lateral projections, and a coil spring extending under all of the said projections to hold the pawls in normal position.

28. In a calculating machine, the combination with a counter, of a driving member, driven members, pivoted pawls arranged in series or banks on the driving member and adapted to engage the driven members and a single spring for each series of pawls arranged to hold them in their normal positions.

29. In a calculating machine, the combination with a counter, of a driving frame, counter operating bars arranged to be operated by said frame, and means for automatically coupling the bars to the frame to prevent over-throw after the movement of the bar has commenced.

30. In a calculating machine, the combination with a counter, of a driving frame, counter operating bars arranged to be operated by said frame, and means for coupling the bars to the frame to prevent overthrow after the movement of the bars has commenced.

31. In a calculating machine, the combination with a counter, of a driving frame, counter operating bars arranged to be operated by said frame, racks mounted on said frame and pawls carried by the bars and arranged to engage said racks to prevent overthrow after the movements of the bars have commenced.

32. In a calculating machine, the combination with a counter, of a driving frame counter operating bars arranged to be operated by said frame, pawls mounted on said bars and arranged to engage the frame to prevent overthrow, and a stationary bar arranged to engage said pawls and normally hold them out of engagement with the frame.

33. In a calculating machine, the combination with a counter, of a driving frame, counter operating bars carrying locking pawls, racks on the frame arranged to be engaged by said pawls, and a stationary bar arranged to normally hold said pawls out of engagement with said racks.

34. In a calculating machine, the combination with a counter, of a driving frame, a series of counter operating bars, spring pressed pawls mounted on the respective bars and having tripping projections, a series of racks mounted on the frame and adapted to be engaged by said pawls and a stationary bar arranged to normally hold said pawls out of engagement with said racks.

35. In a calculating machine, the combination with a counter, of a driving member having racks, counter operating elements arranged to be operated by said member, and pawls carried by the operating elements and arranged to engage said racks to prevent overthrown after the movements of the elements have been commenced.

36. In a calculating machine, the combination with a counter, of a movable driving frame, a series of counter operating bars carrying racks, and a movable frame arranged to be operated by the driving frame to simultaneously engage all the racks and prevent overthrow of the bars.

37. In a calculating machine, the combination with a counter, of a movable driving frame, a series of counter operating bars carrying racks, a pivoted frame arranged to engage all of said racks to arrest the bars, and a cam connected to said pivoted frame and arranged to be struck and operated by the driving frame.

38. In a calculating machine, the combination with an operating mechanism, of a counter, a series of counter operating elements carrying racks and a movable device actuated by the operating mechanism to simultaneously engage all of the racks and prevent overthrow of the counter operating elements.

39. In a calculating machine, the combination with a counter, of an operating mechanism, a stationary keyboard comprising a series of keys, a releasing device for said keys, a ratchet wheel for operating the releasing device, and means for adjusting the ratchet wheel so that it will operate said releasing device after it has turned through a certain predetermined portion of a revolution.

40. In a calculating machine, the combination with a counter, of mechanism for operating the same, a rotary repeating device, means for giving said device a step-by-step movement by successive operations of the machine, a notched disk, a pawl resting on said disk, a series of keys and detents for the keys arranged to be operated by said pawl.

41. In a calculating machine, the combination with a counter, of mechanism for operating the same, a rotary repeating device including a notched disk, a pawl engaging said disk, a series of keys, key detents and means operated by said pawl for operating said detents.

42. The combination with a series of keys, of a series of locking slides, an operating handle, means operated by said handle for moving the slides to release the keys, and devices for rendering said means inoperative in connection with the handle.

43. The combination with a series of keys, of a series of locking plates, an operating handle, a movable frame for operating the plates arranged to be actuated by said handle, and means under control of the operator for rendering said frame inoperative.

44. The combination with a series of keys, of a series of locking plates, an operating handle, means for moving the locking plates actuated by said handle, and a device for rendering said means inoperative in connection with the handle.

45. In a calculating machine, the combination with an operating mechanism including a series of keys, means for holding the keys in their operative positions, a pivoted frame and connections for actuating said means, and means for rendering said connections inoperative for a desired number of operations of said frame.

46. In a calculating machine, the combination with an operating mechanism including a series of keys, latches for holding the keys in their depressed positions, a latch operating mechanism, and means arranged to be set to suspend the movements of the latch actuating mechanism for a desired number of operations, and means preventing reverse movement of said suspending means.

47. In a calculating machine having a movable part, the combination with a stationary keyboard comprising a series of keys arranged in banks, of an independently movable latch plate for each bank, a frame adapted to be operated by said movable part to move all of the latch plates simultaneously, means for operating the frame by hand independently of the movement of said movable part, and means for suspending the operation of the frame by the movable part for a predetermined number of operations of said part.

48. In a calculating machine having a movable part, the combination with a stationary keyboard comprising a series of keys, of a series of independent slidable latch plates, means for operating said plates upon the regular operation of said movable part, devices for operating said plates to release the keys independently of the regular operation of said movable part, and means for suspending the operation of the frame by the movable part for a predetermined number of operations of said part.

49. In a calculating machine, the combination with a series of keys arranged in banks, of a slidable latch plate for each bank, a pendent operating rod for each plate and a pivoted yoke adapted to operate all of said pendent rods to move the latch plates and release the keys.

50. In a calculating machine having movable parts, the combination with a series of keys, of a series of independent latch plates having latching noses that coact with said keys, pendent rods on said plates springs for drawing said plates independently into latching position, and means connected to said movable parts for operating said pendent rods.

51. In a calculating machine, the combination with a plurality of adding members, of printing devices therefor, duplicate stepped members connected to each printing device to determine the set position thereof selectively in accordance with the position of the adding members, and a total key for allowing the stepped members to move into operative position.

52. In a calculating machine, the combination with a counter, of an operating mechanism, a printer, totalizing devices for the printer, a series of keys, latches for the keys, means for operating said latches when the totalizing devices are actuated to release any depressed keys and means controlled by the totalizing devices for preventing operation of the counter.

53. In a calculating machine, the combination with an operating mechanism and a counter, of a registering rack segment pivoted on a movable support, manipulative means for predetermining the extent of movement of said rack segment, and means connected with said operating mechanism for moving said support to carry said segment into engagement with the counter.

54. In a calculating machine, the combination with an operating mechanism and a counter, of a registering rack segment pivoted on a pivoted support, manipulative means for predetermining the extent of movement of said rack segment, and means connected with said operating mechanism for moving said movable support to carry said registering segment into engagement with the counter and then positively actuating the segment to an extent determined by said manipulative means.

55. In a calculating machine, the combination with a counter and an operating mechanism, of a series of registering rack segments pivoted to rotate upon a pivoted support, a series of keys, means controlled by said keys to predetermine the extent of differential movement of said registering segments, and means connected with said operating mechanism for shifting said pivoted support to carry all of said rack segments simultaneously into engagement with the counter and then rotate said segments upon their pivotal points to an extent predetermined by said keys.

56. In a calculating machine, the combination with an operating mechanism having regular excursions at each operation, of an accounting device, operating devices for said accounting device, an oscillating frame including a rod on which said operating devices are pivoted, manipulative amount determining devices, and means controlled thereby for determining the extent of movement of said operating devices.

57. In a calculating machine, the combination with counter wheels, of operating racks for the same, a shaft on which said racks are mounted, a pivoted frame including said shaft, cams for rocking said frame and an operating handle and connections for operating said cams.

58. In a calculating machine, the combination with a counter, of operating racks for the same, a pivoted frame carrying said racks, a controlling shaft having cams for operating said frame, cams on said shaft for sliding same to bring the frame into position to be rocked, and an operating handle for rotating said controlling shaft.

59. In a calculating machine, the combination with a counter, of operating racks for the same, a pivoted frame including a rod on which said racks are pivoted, means for rocking said frame and thereby engaging and disengaging said racks and said counter, and an operating handle having connections for controlling said rocking means.

60. In a calculating machine, the combination with an accounting device, of operating racks for said device, a pivoted frame including a rod on which said racks are pivoted, devices for rocking said frame and thereby engaging and disengaging said accounting device and said racks, means for then oscillating said racks to enter transactions on the accounting device, and a hand operated device having connections for operating said rocking devices and the rack oscillating means.

61. In a calculating machine, the combination with a counter, of a plurality of segment racks for operating said counter, a pivoted frame including a rod on which said racks are pivoted, and a handle having connections to rock said frame and thereby carry all said segment racks simultaneously into and out of operative connection with said counter.

62. In a calculating machine, the combination with a counter, of operating members therefor, a frame carrying said members, a shaft, and cams on said shaft for moving the frame in reverse directions to carry the members into and out of operative relation to the counter.

63. In a calculating machine, the combination with a counter, and operating racks therefor, of a frame on which said racks are carried, a shaft, two cams on said shaft, and a member on the frame adapted to be engaged and operated by the two cams in opposite directions.

64. In a calculating machine, the combination with counter operating devices, of a counter, throwing means for bringing the counter and operating devices together and a laterally movable member carrying cams which are alternately brought into coöperative relation with the throwing means.

65. In a calculating machine, the combination with a counter, of counter operating racks, pivoted levers supporting said racks and adapted to move them into connection with the counter, a rock shaft carrying cams and means for moving the shaft longitudinally when operated to bring the cams alternately into coöperative relation with the levers.

66. In a calculating machine, the combination with a counter, of counter operating racks, throwing means for bringing the counter and the operating racks together, an operating shaft, cams on said shaft, and means for moving the shaft longitudinally when operated to bring the cams alternately into coöperative relation with the throwing means.

67. In a calculating machine, the combination with a counter, of counter operating devices, throwing means for bringing the counter and the operating devices together, an operating shaft, means for moving the shaft longitudinally when actuated, and devices carried by the shaft and arranged to be brought alternately into coöperative relation with the throwing means.

68. In a calculating machine, the combination with a counter, and operating members therefor, of means carrying said operating members, an operating handle, a member operated thereby, and means giving said member a compound movement to cause movement of the means carrying the operating members for effecting engagement and disengagement of the operating members and the counter.

69. In a calculating machine, the combination with a counter, operating devices engaging and actuating the counter, transfer slides carried by said devices, and means for positively operating the slides for causing them to give the operating devices additional movement.

70. In a calculating machine, the combination with a counter, of operating devices therefor, a counter operating rack connected to said devices, a transfer slide mounted on said rack and arranged to positively operate the latter, and means coöperating with the counter and arranged to engage and operate said slide.

71. In a calculating machine, the combination with a counter, of operating devices thereof, a counter operating rack connected to said devices, means for moving said rack into and out of mesh with the counter, and a transfer slide mounted on said rack, and arranged to positively move the same.

72. In a calculating machine, the combination with a counter, of operating devices therefor, a counter operating rack connected to said devices, a transfer slide mounted on said rack, means connecting said slide and an element of said operating devices for positively operating the rack when said slide is operated, and means coöperating with the counter for operating said slide.

73. In a calculating machine, the combination with a counter, of counter operating devices, a transfer slide carried by said devices, a transfer pawl for operating said slide, and a movable arm arranged to engage and operate said pawl.

74. In a calculating machine, the combination with a counter, of operating devices, a counter operating rack, means connecting said device and rack whereby the latter is moved with the former but may be moved independently of the same, and a transfer slide for moving the rack independently of the operating devices.

75. In a calculating machine, the combination with a counter, of operating devices, a counter operating rack having an elongated slot, an operating arm connected to the operating devices and having a pin which projects through said slot and a transfer slide having a diagonal slot for the reception of said pin.

76. In a calculating machine, the combination with a counter, of counter operating devices, transfer slides carried by said devices and arranged to positively actuate the same when operated and mechanism for operating said slides from the counter.

77. In a calculating machine, the combination with a counter, of pivoted counter operating racks, transfer slides mounted on said racks and means connecting said racks and slides for positively moving the former on their pivots when the latter are actuated.

78. In a calculating machine, the combination with a counter, of counter operating racks, transfer slides mounted on said racks, and means connecting said racks and slides whereby the longitudinal movements of the latter cause lateral movements of the former.

79. In a calculating machine, the combination with a counter, of counter operating racks, transfer slides mounted on said racks, transfer pawls arranged to be released by the counter and means for moving the pawls to cause them to actuate the transfer slides.

80. In a calculating machine, the combination with a counter, counter operating racks, transfer slides mounted on said racks and means for operating said slides whereby the racks are moved an additional tooth.

81. In a calculating machine, the combination with a counter, of operating devices, a counter operating member, means connecting said operating devices and member whereby the latter is moved with the former but may be moved independently of the same, and a transfer slide for positively moving the counter operating member independently of the operating devices.

82. In a calculating machine, the combination with a counter, of counter operating devices and movable means carried by the counter operating device and arranged when operated by the counter to give a positive additional movement to the operating device to effect a transfer.

83. In a calculating machine, the combination with a counter, of counter operating devices, a movable member carried by the said devices and arranged to be operated by the counter for positively moving the operating devices an additional degree when said movable member is operated.

84. In a calculating machine, the combination with an operating mechanism, of a series of counting elements, transfer devices between said elements, means operated by the counting elements for setting the transfer devices for subsequent operation, and movable elements for adjusting said means to inoperative position at will.

85. In a calculating machine, the combination with a counter, of operating racks for the same and an actuating device for said racks, including means for giving said racks a positive transfer movement, of movable elements carried upon said racks, the position of said elements relative to said racks controlling the positive transfer operation.

86. In a calculating machine, the combination with counter elements, of racks for operating same, transfer slides carried by said racks, transfer pawls set by said elements and means for operating said slides when the transfer pawls have been set.

87. In a calculating machine, the combination with operating elements, of racks operated thereby, accounting elements controlled by said racks, transfer slides carried by said racks and means for giving said slides a positive transfer movement, to cause movement of said racks.

88. In a calculating machine, the combination of accounting devices, and operating elements therefor, of transfer devices controlled by said accounting devices after a predetermined movement thereof, means controlled by said transfer devices for giving said operating elements an additional positive increment of movement controlled by said transfer devices, and means for successively operating said elements to effect the transfers.

89. In a calculating machine, the combination with accounting devices, of means for operating same, transfer devices and means for successively giving said operating means an additional positive movement to effect the transfers.

90. In a calculating machine, the combination with a plurality of accounting devices, of racks for operating the same, trip devices set when one accounting device has moved a predetermined distance, transfer devices, and means controlled by said trip devices when set for operating said transfer devices to give said racks successively an additional positive movement to effect the transfers.

91. In a calculating machine, the combination with a series of adding wheels, of racks for operating same, transfer slides mounted on said racks, trips adapted to be set when an adding wheel has moved a predetermined distance, and means controlled by the trips when set for giving said racks successively an additional movement to effect the transfers.

92. In a calculating machine, the combination with a series of adding elements, and rack bars for operating them, of transfer pawls tripped by said adding elements, camming slides for moving said rack bars additional steps, and levers for forcing said pawls against said slides to effect the transfers.

93. In a calculating machine, the combination with a series of adding elements, and rack bars for operating them, of transfer pawls tripped by said adding elements, camming slides for moving said rack bars additional steps, and a series of levers for successively forcing the tripped transfer pawls to depress said camming slides to effect the transfers.

94. In a calculating machine, the combination with a counter, of operating racks for the same, means mounted on said racks for moving same an additional space, transfer controlling devices set from the counter, and means for positively operating the moving means carried by the racks.

95. In a calculating machine, the combination with a counter, of counter operating devices, transfer slides, transfer pawls for operating said slides, and a series of pivoted levers having graduated shoulders for successively operating said pawls.

96. In a calculating machine, the combination with a counter, of counter operating devices, mechanism for throwing said devices out of operative connection with the counter, and means for preventing operation of said mechanism after the operation of the machine has commenced.

97. In a calculating machine, the combination with a counter, of an operating mechanism, a lever for disconnecting the counter from said mechanism and a movable latch arranged to lock said lever after the movement of the operating mechanism has commenced.

98. In a calculating machine, the combination with an operating mechanism, of a series of counting elements including transfer devices, means for setting the transfer devices for operation, and a series of keys for throwing said means out of operative position at will.

99. In a calculating machine, the combination with a counter, and means for operating the same, of printing devices for printing the totals of amounts registered upon the counter, a total key and connections for controlling such total printing, and means connected with the total key for throwing the counter out of operation.

100. In a calculating machine, the combination with an operating mechanism, printing and adding mechanism controlled thereby, devices for setting the printing mechanism in agreement with the amount registered on the adding mechanism, keys controlling said adding mechanism, a total key controlling said setting devices, and means actuated by said total key for releasing said depressed adding keys; of means also controlled by said total key for disconnecting the adding mechanism from the operating mechanism.

101. In a machine of the class described, the combination with a main operating mechanism, of registering and recording means, a total key, a latching pawl for holding said total key depressed, and devices actuated by said main actuating mechanism for tripping said latching pawl.

102. In a calculating machine, the combination with a key board, of registering and recording mechanisms, a total key, and means for locking said total key in a depressed position to force a complete operation of the machine; substantially as described.

103. In a calculating machine, the combination with a key board, of registering and recording mechanisms, a power shaft for driving said mechanisms, a total key, and connections between said total key and said power shaft for compelling a complete operation of the latter upon the actuation of said total key, substantially as shown.

104. The combination with the keys, recording means and accumulator or number wheels of an adding machine, of a key, and connections whereby to mechanically hold the key down during each complete operation of the machine in taking totals to adjust the parts to secure a printing of a total without leaving the accumulator wheels at zero; substantially as set forth.

105. The combination with the total key of an adding machine, of a detent for holding the same down, and means for releasing said detent as the parts of the machine assume their normal position; substantially as set forth.

106. In a machine of the class described, the combination with an operating mechanism, of registering and recording means controlled thereby, a total key, and a locking element with connections whereby actuation of the operating mechanism moves said locking element to a position obstructing the total key.

107. In a machine of the class described, the combination with an operating mechanism, of registering and recording means controlled thereby, a total key, means spring pressed to lock the total key when depressed, and a locking device moved by said operating mechanism to a position obstructing said total key.

108. In a machine of the class described, the combination with an operating mechanism, of registering and recording means controlled thereby, a total key, means for holding said total key depressed, and connections from said operating mechanism for withdrawing said holding means.

109. In a machine of the class described, the combination with an operating mechanism, of registering and recording mechanism controlled thereby, manipulative means for controlling recording of totals, means for retaining said manipulative means in operated position, and connections actuated from said operating mechanism for releasing said holding means.

110. In a machine of the class described, the combination with an operating mechanism, of registering and recording mechanism controlled thereby, manipulative means controlling the recording of totals, devices for retaining said manipulative means in operated position, and means controlled by said operating mechanism for preventing actuation of said manipulative total controlling means.

111. In a calculating machine, the combination with an oscillating frame, of a series of operating bars arranged to be coupled thereto, a series of movable bar operating devices mounted on the frame and so arranged that when one of the same is elevated all the remaining devices to one side are also elevated, a series of keys, and means for causing the elevation of one of said devices when a key in its particular bank is operated, and a printing device connected to said bars.

112. In a calculating machine, the combination with an oscillating frame, of a series of operating bars, levers mounted on said bars and adapted to be raised when moved with said bars and a series of movable bar operating devices on said frame arranged to be elevated by said levers, and a printing device connected to said bars.

113. In a calculating machine, the combination with an oscillating frame, of a series of operating bars, levers mounted on said bars and arranged to be raised upon the movement of the latter, a series of pivoted bar operating devices mounted on said frame and arranged to be raised by said levers, and a printing device connected to said bars.

114. In a calculating machine, the combination with an oscillating frame, of a series of operating bars, levers mounted on said bars and arranged to be raised upon the movement of the latter, a series of pivoted bar operating pawls mounted on the frame so as to be raised by said levers in such manner that all of said pawls to one side of a raised pawl will also be elevated, and a printing device connected to said bars.

115. In a calculating machine the combination with a driving member, of a series of driven bars, cam levers mounted on said bars, a cross bar with which said levers cooperate upon being moved longitudinally, and a series of bar operating pawls mounted on the driving member and adapted to be raised to operative positions by the levers.

116. In a calculating machine the combination with a counter, of a driving member, driven members, a printer connected to the latter members, movable operating devices for said driven members so arranged that when one of the same is moved to operative position all the remaining devices to the right of the same will be similarly moved, a series of keys arranged in groups and means for causing any of said devices to be moved to operative position if a key in its respective group is operated.

117. In a calculating machine, the combination with a counter, of a driving member, driven members, a printer connected to the latter members, movable operating devices for the driven members so arranged that when one of the same is moved to operative position all the remaining operating devices to the right of the same will be similarly moved.

118. In a calculating machine, the combination with a driving member having a uniform to and fro movement, driven members, means for coupling the driven members to the driving member, cam levers mounted on the driven members and arranged to be operated upon the movement of said members, and devices mounted on the driving member and arranged to be moved by an elevated cam lever into position to actuate all of the driven members to one side of the same.

119. In a calculating machine, the combination with an operating frame, of a series of common operating elements, a counter movable device mounted on said elements and adapted to be actuated when moved with the elements and a series of movable element operating devices on the operating frame and arranged to be moved into operative position by said movable devices, and a printing device connected to said operating elements.

120. In a calculating machine, the combination with a driving frame, of a series of operating bars, movable devices mounted on the bars and arranged to be actuated by the movements thereof, and a series of bar operating elements mounted on the frame and arranged to be moved into operative position by the movable devices mounted on the bars.

121. In a calculating machine, the combination with an operating mechanism and a platen operated thereby, a plurality of type carriers, each having a type normally out of printing position, means for coupling the carriers to the operating mechanism as desired, and an independent means operated by any carrier to couple all carriers of lower denomination to the operating mechanism to bring the said type to printing position.

122. In a calculating machine, the combination with an operating mechanism and a platen operated thereby, of oscillating type carriers, means for moving them by the operating mechanism to differential positions, and means controlled by the movement of any carrier for causing the operating mechanism to set all carriers of lower denomination to print.

123. In a calculating machine, the combination with a counter, of a movable frame, a series of bars arranged to be operated by said frame, a printer connected to said bars, levers having graduated projections mounted on said bars, and arranged to be engaged by a projection of the frame and means connecting said levers to the counter whereby they may be set according to its condition.

124. In a calculating machine, the combination with a counter, of a series of operating bars, a movable frame for operating said bars, pivoted levers having graduated projections mounted on said bars and arranged to be engaged by the frame, a printer connected to said bars, projections on the counter wheels and levers coöperating with said projections and connected to the aforesaid pivoted levers.

125. In a calculating machine, the combination with a counter and a printer, of a driving member, a driven member, a movable graduated device mounted on the driven member, a slotted link connected to the graduated device, means connecting said link to the counter, and means connecting the driven member to the printer.

126. In a calculating machine, the combination with a counter, of a driving member, a driven member, a printer connected to the latter member, movable graduated devices mounted on the driven member and arranged to be operated by the driving member, means connecting the counter and the graduated devices, a special key, holding means for the graduated devices and mechanism connected to said key for releasing the graduated devices.

127. In a calculating machine, the combination with a counter, of a driving member, a series of driven members, pivoted levers having graduated projections mounted on said driven members, a printer connected to said driven members and means connecting the pivoted levers and counter.

128. In a calculating machine, the combination with a counter, of a driving member, a series of driven members, a printer connected to said latter members, movable graduated devices mounted on the driven member and arranged to be engaged by the driving member and means connecting the counter and said graduated devices.

129. In a calculating machine, the combination with a driving member, of driven members, a counter, movable graduated devices mounted on the driven members, pivoted levers arranged to engage pins mounted on the counter, links connecting the graduated devices and levers, a printer connected to the driven members, a special key and devices for normally holding the pivoted levers out of operative positions, arranged to be operated by said key.

130. In a calculating machine, the combination with a counter, of a driving member, a driven member, graduated means on the driven member arranged to be set by the counter and coöperating with the driving member, and a printer connected to the driven member.

131. In a calculating machine, the combination with a counter, of a driving member, a driven member, a graduated device mounted on the driven member, means connecting the counter and graduated device, and a printer connected to the driven member.

132. In a calculating machine, the combination with counter wheels, of a driving member, a driven member, movable graduated devices mounted on the driven member, pins mounted on the counter wheels and means coöperating with said pins and arranged to control the graduated devices, and a printer connected to the driven member.

133. In a calculating machine, the combination with a counter, of an operating member, a series of counter operating elements, a printer connected to said elements, movable graduated devices mounted on said elements and arranged to be engaged by the operating member and means coöperating with the counter for controlling the positions of the graduated devices.

134. In a calculating machine, the combination with an operating mechanism and a series of accumulating devices, of printing devices and operating devices therefor, a plurality of means for connecting the operating mechanism to the printer operating devices, value keys controlling one of said connecting means and a total key controlling another of said connecting means.

135. In a calculating machine, the combination with a counter, of operating mechanism therefor, a printer, totalizing devices for said printer, a totalizing key, a lever for throwing the operating mechanism out of connection with the counter and means operated by the totalizing key for actuating said lever.

136. In a calculating machine, the combination with a series of operating elements, of a plurality of counting elements, a printer, and duplicated means for each operating element for selectively controlling the movement of the operating elements according to the amount registered on the counting elements.

137. In a calculating machine, the combination with an operating mechanism, of a printer, a plurality of registering elements, a key, and means in duplicate for each registering element and released by said key, for controlling the movement of the operating mechanism.

138. In a calculating machine, the combination with accounting devices, of printing devices therefor, means in duplicate for each accounting device for selectively controlling the corresponding printing device according to the position of the accounting device, and manipulative means for allowing said duplicate means to operate.

139. In a calculating machine, the combination with a plurality of adding members, of printing devices therefor, duplicate stepped members connected to each printing device to determine the set position thereof selectively in accordance with the position of the adding members, and a total key for allowing the stepped members to move into operative position.

140. In a calculating machine, the combination with a series of spaced operating slide bars, a series of pivoted printing segments located out of alinement with said bars and pivoted levers operated by said bars and laterally extending rods connecting said levers and segments.

141. In a calculating machine, the combination with a counter, of a driving frame, a series of counter operating bars, a series of connecting pawls mounted on the frame, a series of keys for operating said pawls, printing segments connected to said bars, printing devices and means for rendering said devices inoperative at will.

142. In a calculating machine, the combination with a series of type carriers, of a platen, link bars for operating said platen provided with hook ends, operating devices carrying pins which engage said hook ends, means for disengaging the hooks from said pins, and means for locking the bars against movement when the hooks are disengaged from the pins.

143. In a calculating machine, the combination with a series of type carriers, of a platen coöperating therewith, link bars for operating said platen, operating devices engaging said bars, means for disengaging said bars from the operating devices, and means for locking said bars against movement when so disengaged.

144. In a calculating machine, the combination with a counter, of a printer, a series of keys, a driving member, driven members, pivoted pawls mounted on the driving member and arranged to engage the driven members when depressed by the keys, means connecting the driven members and the printer, a series of pivoted racks for operating the counter, means connecting the said racks to the driven members, and independent devices for throwing the counter or the printer out of operative connection with the machine at will.

145. In a machine of the character described, the combination with a prime mover, accounting elements adapted to be operated thereby, manipulative amount-determining devices adapted when set to supply fixed controls for said accounting elements, detent means adapted to hold said devices set and means for releasing the amount-determining devices from the detent means; of means for disabling the releasing means, and controlling devices adapted automatically to reënable said releasing means in a predetermined number of successive operations of the prime mover.

146. In a machine of the character described, the combination with a prime mover, accounting elements adapted to be operated thereby, manipulative amount-determining devices adapted when set to supply fixed controls for said accounting elements, detent means adapted to hold said devices set and means for releasing the amount-determining devices from the detent means, including a member reciprocated by the prime mover; of means for interfering with the action of said member, and means for removing the interference in a predetermined number of operations of the prime mover.

In testimony whereof I affix my signature, in the presence of two witnesses.

THOMAS CARROLL.

Witnesses:
 IRA BERKSTRESSER,
 CHAS. E. CRUSOE.